US011269998B2

(12) United States Patent
Watanabe

(10) Patent No.: US 11,269,998 B2
(45) Date of Patent: Mar. 8, 2022

(54) IMAGE DATA ALTERATION DETECTION DEVICE, IMAGE DATA ALTERATION DETECTION METHOD, AND DATA STRUCTURE OF IMAGE DATA

(71) Applicant: JVCKENWOOD Corporation, Yokohama (JP)

(72) Inventor: Yuuki Watanabe, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 123 days.

(21) Appl. No.: 16/743,062

(22) Filed: Jan. 15, 2020

(65) Prior Publication Data

US 2020/0151331 A1 May 14, 2020

Related U.S. Application Data

(63) Continuation of application No. PCT/JP2018/028375, filed on Jul. 30, 2018.

(30) Foreign Application Priority Data

Aug. 23, 2017 (JP) .............................. JP2017-160606

(51) Int. Cl.
*G06F 21/55* (2013.01)
*G06F 21/64* (2013.01)
*H04L 9/32* (2006.01)

(52) U.S. Cl.
CPC ............ *G06F 21/554* (2013.01); *G06F 21/64* (2013.01); *H04L 9/3236* (2013.01); *G06F 2221/034* (2013.01)

(58) Field of Classification Search
CPC .. G06F 21/554; G06F 21/64; G06F 2221/034; H04L 9/3236; H04L 9/32; G09C 1/00; G09C 5/00
See application file for complete search history.

(56) References Cited

U.S. PATENT DOCUMENTS 7,251,343 B2 * 7/2007 Dorrell .............. H04N 1/32144
382/100
10,878,095 B2 * 12/2020 Skvortsov ........... G06F 16/2365
(Continued)

FOREIGN PATENT DOCUMENTS

JP 2007-318412 12/2007
JP 4482451 6/2010
(Continued)

OTHER PUBLICATIONS

Written Opinion for International Patent Application No. PCT/JP2018/021626 dated Aug. 7, 2018, 4 pages.
(Continued)

*Primary Examiner* — Christopher A Revak
(74) *Attorney, Agent, or Firm* — Amin, Turocy & Watson, LLP

(57) ABSTRACT

To provide an image data alteration detection device, an image data alteration detection method, and a data structure of image data that can easily detect an alteration in image data. Metadata in image data includes a first hash value calculated based on predetermined data, a second hash value calculated based on a character string of a script, and the script. An image alteration detection device calculates a third hash value based on the predetermined data and the script included in the metadata, calculates a fourth hash value based on a character string of the script included in the metadata, compares the first hash value included in the metadata with the calculated third hash value and the second hash value included in the metadata with the calculated fourth hash value, and detects that the image data is altered when one of the values is not equal.

3 Claims, 17 Drawing Sheets

(56) References Cited

U.S. PATENT DOCUMENTS

| | | | |
|---|---|---|---|
| 2003/0188180 A1* | 10/2003 | Overney | H04L 9/0869 |
| | | | 713/193 |
| 2005/0277403 A1 | 12/2005 | Schmidt et al. | |
| 2006/0259781 A1 | 11/2006 | Saeki et al. | |
| 2007/0177718 A1 | 8/2007 | Shimosato et al. | |
| 2009/0245509 A1 | 10/2009 | Shimosato et al. | |
| 2010/0251347 A1* | 9/2010 | Roskind | H04L 63/0815 |
| | | | 726/5 |
| 2014/0143206 A1* | 5/2014 | Pittelko | G06F 16/137 |
| | | | 707/634 |
| 2017/0251162 A1 | 8/2017 | Iso et al. | |

FOREIGN PATENT DOCUMENTS

| | | |
|---|---|---|
| JP | 5350782 | 11/2013 |
| WO | 2005/029765 | 3/2005 |

OTHER PUBLICATIONS

Written Opinion for International Patent Application No. PCT/JP2018/028375 dated Oct. 16, 2018, 6 pages.

Seki, Study of Workflow Improvement for photograph management making sued of metadata, No. May 2011, <URL: https://www.jacic.or.jp/josei/pdf/2011-05.pdf> Nov. 2012, retrieved Oct. 9, 2018.

International Search Report and Written Opinion for International Patent Application No. PCT/JP2018/028375 dated Oct. 16, 2018, 9 pages.

* cited by examiner

IMAGE DATA ALTERATION DETECTION DEVICE, IMAGE DATA ALTERATION DETECTION METHOD, AND DATA STRUCTURE OF IMAGE DATA

CROSS-REFERENCE TO RELATED APPLICATION

This application is a continuation of PCT International Application No. PCT/JP2018/028375 filed on Jul. 30, 2018 which claims the benefit of priority from Japanese Patent Application No. 2017-160606 filed on Aug. 23, 2017, the entire contents of which are incorporated herein by reference.

BACKGROUND

1. Technical Field

The present disclosure relates to an image data alteration detection device, an image data alteration detection method, and a data structure of image data.

2. Description of the Related Art

Changes and alterations made on data are a serious threat to devices that handle the data. Thus, ensuring data integrity has become an important issue. In recent years, various technologies have been developed to detect data alterations (for example, Japanese Patent No. 4482451, Japanese Patent No. 5350782, and Japanese Laid-open Patent Publication No. 2007-318412 A).

In a method for controlling a user data object disclosed in Japanese Patent No. 4482451, indestructibility of a user data object is estimated by a checksum in the package (paragraph 0015 in Japanese Patent No. 5350782).

In an alteration detection device of metadata disclosed in Japanese Patent No. 5350782, an alteration is detected by calculating a hash value (paragraph 0049 in Japanese Patent No. 5350782).

In an image recording device disclosed in Japanese Laid-open Patent Publication No. 2007-318412 A, an alteration is determined by generating a hash value on the basis of image data for each field (paragraph 0022 in Japanese Laid-open Patent Publication No. 2007-318412 A).

In methods disclosed in Japanese Patent No. 4482451, Japanese Patent No. 5350782, and Japanese Laid-open Patent Publication No. 2007-318412, the calculation method of a hash value needs to be unified in advance, at the data generation side and the data reproduction side. Thus, when data is altered by a third party, the unified calculation method needs to be changed every time the data is altered. Consequently, a large amount of labor and time is required.

Moreover, because the calculation method is defined by the type of data and format, there is no flexibility in the calculation method of a hash value at the data generation side. Consequently, a large amount of data may be altered by a specific alteration method.

SUMMARY

It is an object of the present disclosure to at least partially solve the problems in the conventional technology.

To solve the above problems, a data alteration detection device according to the present disclosure includes an alteration detection unit that detects an alteration in image data including data obtained by encoding an image and metadata that is data relating to the data. The metadata at least includes a first hash value calculated based on a parameter embedded in a predetermined area of the image data in advance, a second hash value calculated based on a character string of a script for generating a hash value, and the script, and the alteration detection unit calculates a third hash value based on the parameter and the script included in the metadata, calculates a fourth hash value based on the character string of the script included in the metadata, compares the first hash value included in the metadata with the third hash value being calculated and the second hash value included in the metadata with the fourth hash value being calculated, and detects that the image data is altered when one of the values is not equal.

The data alteration detection device according to the present disclosure, further preferably includes an image data reproduction unit that reproduces an image based on the image data, when an alteration in the image data is not detected by the alteration detection unit.

Further, a data alteration detection method according to the present disclosure includes detecting an alteration in image data including data obtained by encoding an image and metadata that is data relating to the data. The metadata at least includes a first hash value calculated based on a parameter embedded in a predetermined area of the image data in advance, a second hash value calculated based on a character string of a script for generating a hash value, and the script. The detecting an alteration further includes calculating a third hash value based on the parameter and the script included in the metadata, calculating a fourth hash value based on a character string of the script included in the metadata, and comparing the first hash value included in the metadata with the third hash value being calculated, and the second hash value included in the metadata with the fourth hash value being calculated. The comparing detects that the image data is altered when one of the values is not equal.

Further, a data structure of image data according to other aspect of the present disclosure, includes data obtained by encoding an image, and metadata that is data relating to the data. The metadata at least includes a first hash value calculated based on a parameter embedded in a predetermined area of the image data in advance, a second hash value calculated based on a character string of a script for generating a hash value, and the script.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Hereinafter, an image reproduction technology relating to the present disclosure will be described in detail with reference to FIG. 1 to FIG. 9, and FIG. 13 to FIG. 18. Moreover, an embodiment of an image data alteration detection device, an image data alteration detection method, and a data structure of image data according to the present disclosure will be described in detail with reference to FIG. 10 to FIG. 12. Each of the image reproduction processes in FIG. 1 to FIG. 9 and FIG. 13 to FIG. 18 may be carried out by combining with an image data alteration detection described with reference to FIG. 10 to FIG. 12. The image data alteration detection device, the image data alteration detection method, and the data structure of image data according to the present disclosure are not limited to the disclosed embodiment. Descriptions will be made in the following order.

Figure 1:
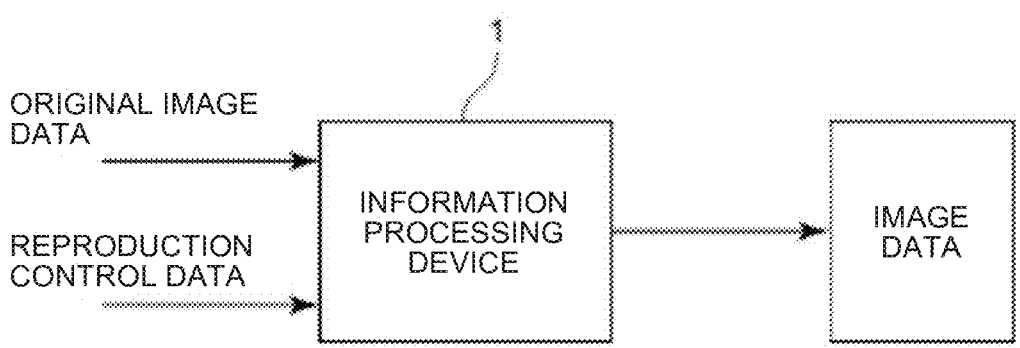
FIG. 1 is a diagram illustrating an overview of a generation process of image data in which metadata is stored.

1. Overview of Generation Process of Image Data in which Metadata is Stored
2. Example of Image Reproduction Process
3. Example of Image Reproduction Process Accompanied by Reproduction of Audio
4. Example of Image Reproduction Process Accompanied by Detection of Alteration in Image Data
5. Modification Overview of Generation Process of Image Data in which Metadata is Stored FIG. 1 is a diagram illustrating an overview of a generation process of image data in which metadata is stored. For example, an information processing device 1 of the present embodiment is a device such as a laptop computer and a desktop computer. The information processing device 1 has a function as an image data generation device and a function as an image reproduction device. The image data generation device generates metadata and generates image data in which the generated metadata is stored. The image reproduction device can reproduce an image from the image data in which the metadata is stored. Thus, a computer program to cause the information processing device 1 to function as the image data generation device and a computer program to cause the information processing device 1 to function as the image reproduction device are installed in the information processing device 1 in advance. However, the information processing device 1 may also function only as the image data generation device or only as the image reproduction device.

The information processing device 1 inputs original image data captured by a camera, or original image data created by image processing (also includes what is called artwork that is data created by image processing software), and inputs reproduction control data of the original image data. For example, the reproduction control data is data including trimming information in which time information and area information are formed as a set. The area information is information to specify a certain area in the original image data. For example, the area information is information including upper left coordinates, width, and height, or information including upper left coordinates and lower right coordinates. The time information is information indicating an elapsed time (elapsed period) from the start of reproduction of the original image data.

The information processing device 1 performs a predetermined encoding process on the input original image data, generates metadata from the input reproduction control data, and generates image data including the encoded data and the generated metadata.

Figure 2:
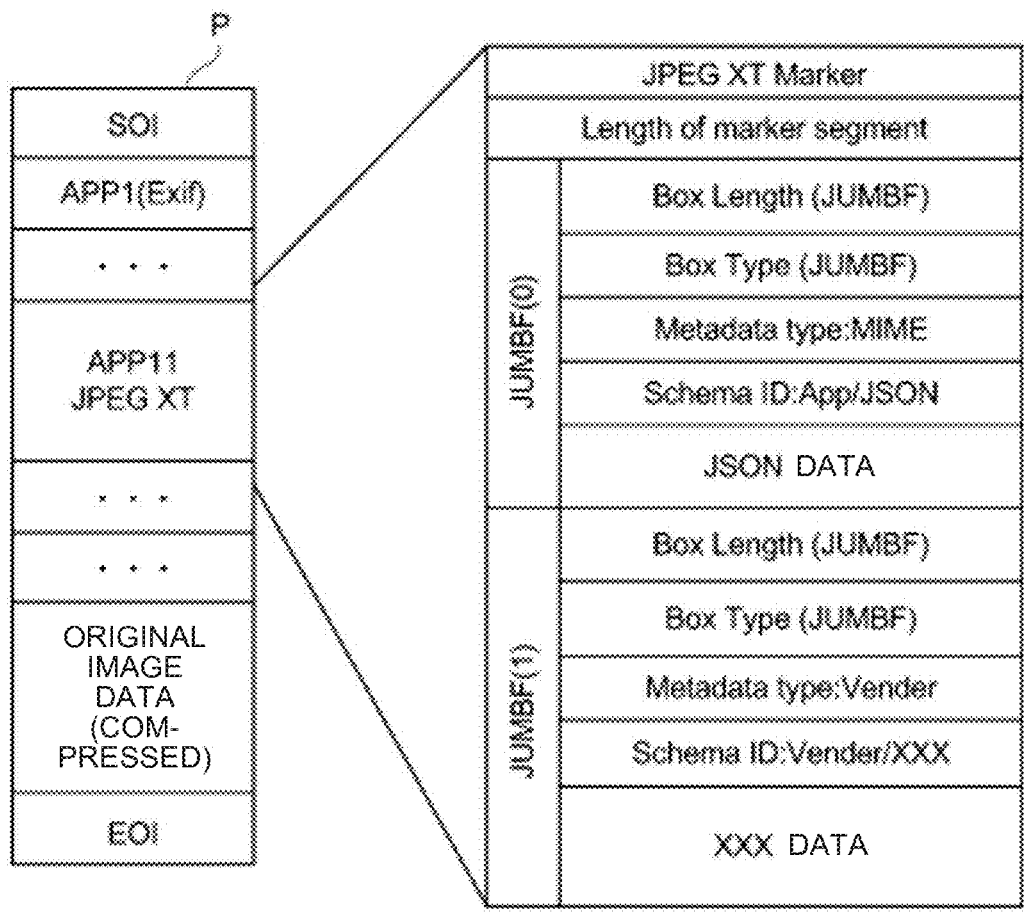
FIG. 2 is a diagram illustrating a format example of image data.

FIG. 2 is a diagram illustrating a format example of image data. As illustrated in FIG. 2, image data P includes areas of start of image (SOI), application marker segment 1 (APP1), . . . , application marker segment 11 (APP11), original image data, and end of image (EOI). For example, the image data P in the present embodiment is defined by JPEG XT Part 3 Box file format that is an extension of a conventional joint photographic experts group (JPEG) standards, and is specified by an extensible box-based file format allowing the user to write flexibly.

SOI is a marker at the beginning of a JPEG file, and indicates the starting point of the JPEG file. The JPEG file is identified by reading the SOI.

APP1 stores Exchangeable image file format (Exif).

APP11 stores metadata defined in JPEG XT Part 3 Box file format that is described using JavaScript Object Notation (JSON). More specifically, APP11 stores the length of the application marker segment and a plurality of pieces of box data. Each box data stores box length, box type, metadata type, schema ID, and metadata. In the example in FIG. 2, box data in JPEG universal metadata box format (JUMBF)(0) stores data in which metadata type is multipurpose internet mail extensions (MIME), schema ID is APP/JSON, and metadata is JSON, and box data in (JUMBF)(1) stores data in which metadata type is Vender, schema ID is Vender/XXX, and metadata is XXX data.

Compressed image encoded data in JPEG format is stored as the original image data.

The EOI is a marker indicating the end of the JPEG file.

As illustrated in FIG. 2, by storing metadata that can be described using JSON in the box file data in APP11 of the image data P, and reading the data specified therein, it is possible to control reproduction of an image.

Figure 3:
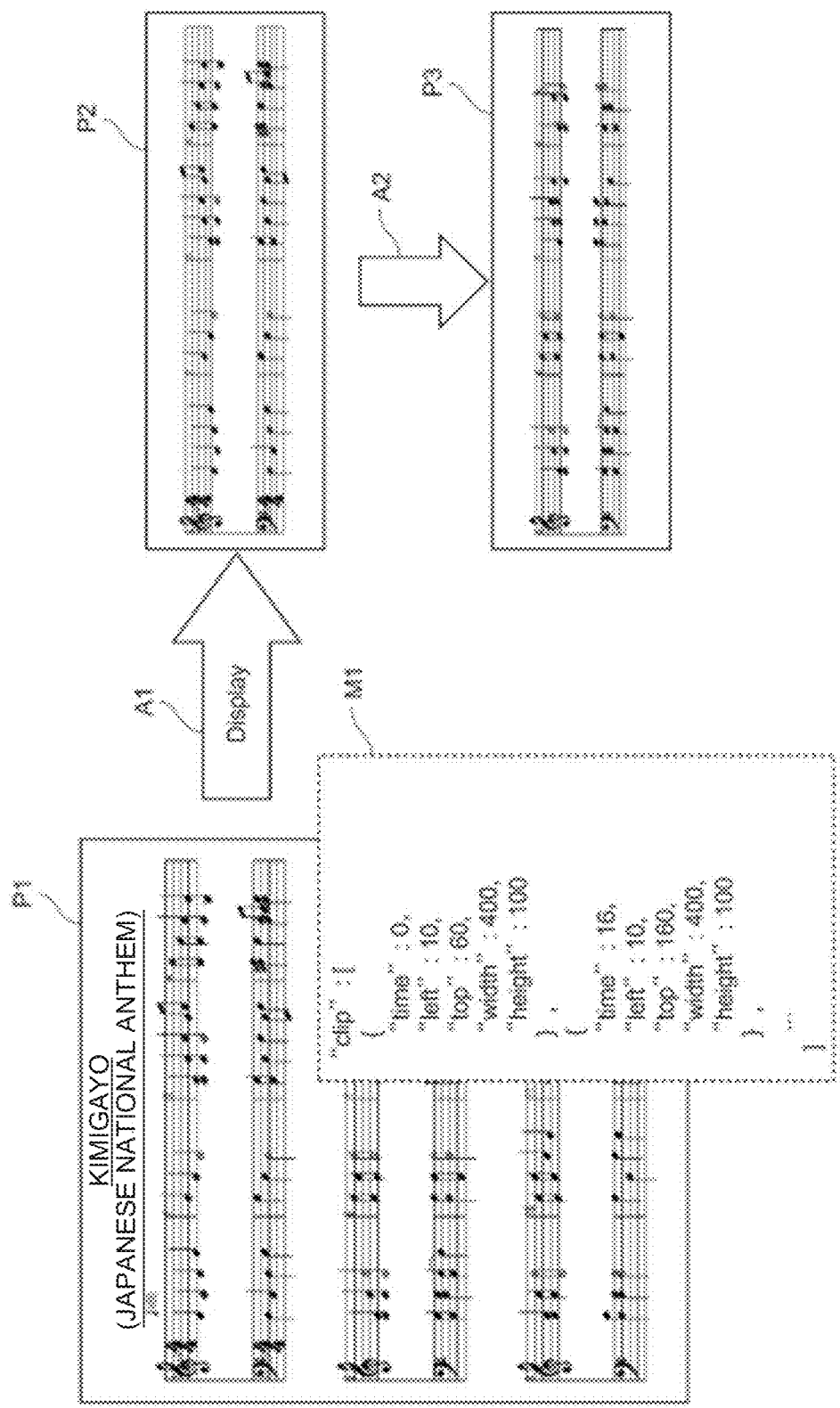
FIG. 3 is a diagram illustrating an example in which a musical score is displayed in a trimmed manner according to a reproduction elapsed time.

Example of Image Reproduction Process for Displaying Image in Trimmed Manner (Example Using Music Score) FIG. 3 is a diagram illustrating an example in which a musical score is displayed in a trimmed manner according to a reproduction elapsed time. As illustrated in FIG. 3, image encoded data composed of a musical score with 12 bars is stored in the original image data of image data P1. Metadata M1 described using JSON is stored in an area of APP11 of the image data P1. In the metadata M1, the first row contains "'clip': [", the second row contains "{", the third row contains "'time': 0,", the fourth row contains "'left': 10,", the fifth row contains "'top': 60,", the sixth row contains "'width': 400,", the seventh row contains "'height': 100", the eighth row contains "},", the ninth row contains "{", the tenth row contains "'time': 16,", the eleventh row contains "'left': 10,", the twelfth row contains "'top': 160,", the thirteenth row contains "'width': 400,", the fourteenth row contains "'height': 100", the fifteenth row contains "},", and the n-th row contains "]".

"'clip'" is information indicating to use a trimming function (clip function). Information described after "'time'" indicates time information, and information described after "'left'", "'top'", and "'width'" indicates area information. In other words, the metadata M1 includes trimming information in which time information and area information used for trimming a predetermined position of an image by a trimming function are formed as a set. By reading out the metadata (trimming information) M1, the information processing device 1 can trim and sequentially display a predetermined area of an image on the basis of the area information associated with the time information, corresponding to an elapsed time from the start of reproduction of the image data P1.

In the example in FIG. 3, when the image data P1 in which the metadata M1 such as above is stored is displayed, during a period from the display start time to the first 16 seconds, an area of 100 pixels in height and 400 pixels in width is trimmed from the position of 10 pixels from left and 60 pixels from top. Consequently, as indicated by an arrow A1, an area P2 of the first four bars is displayed in a trimmed manner.

Next, during a period from when 16 seconds have elapsed from the display start time up to 32 seconds, an area of 100 pixels in height and 400 pixels in width is trimmed, from the position of 10 pixels from left and 160 pixels from top. Consequently, as indicated by an arrow A2, an area P3 of the next four bars is displayed in a trimmed manner.

An operation of displaying the image data such as above in a trimmed manner according to the elapsed time will be described in detail below with reference to a flowchart.

Figure 4:
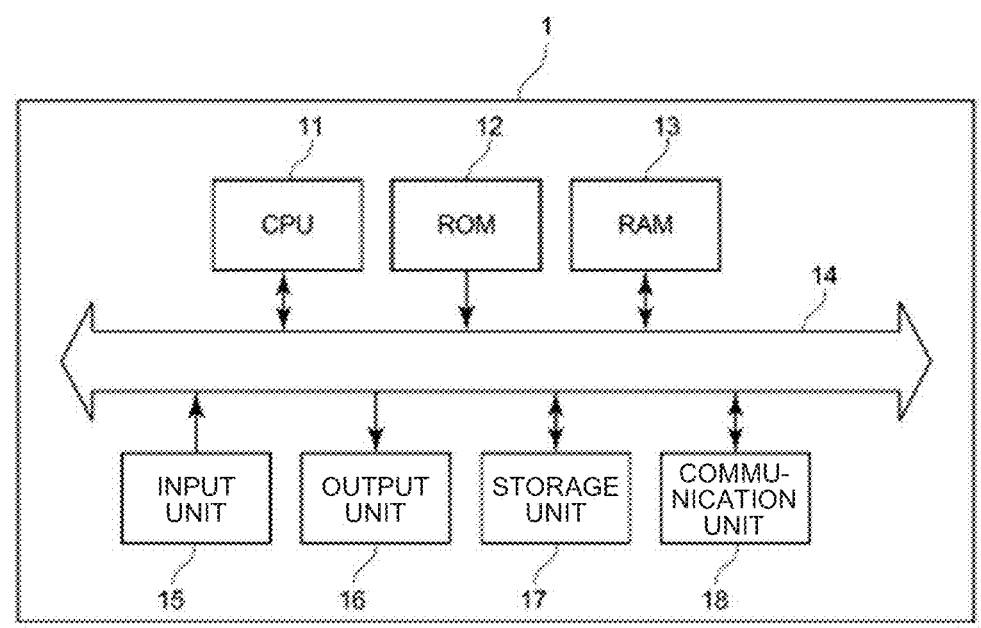
FIG. 4 is a block diagram illustrating an example of a hardware configuration of an information processing device.

Example of Configuration of Information Processing Device FIG. 4 is a block diagram illustrating an example of a hardware configuration of the information processing device 1. The information processing device 1 includes a central processing unit (CPU) 11, a read only memory (ROM) 12, a random access memory (RAM) 13, a bus 14, an input unit 15, an output unit 16, a storage unit 17, and a communication unit 18.

The CPU 11, the ROM 12, and the RAM 13 are connected with each other via the bus 14. The input unit 15, the output unit 16, the storage unit 17, and the communication unit 18 are also connected to the bus 14.

The input unit 15 includes an input device such as a keyboard and a mouse, and supplies various types of information to the CPU 11 via the bus 14. The output unit 16 includes an output device such as a display and a speaker, and displays an image or reproduces audio based on an instruction from the CPU 11. The storage unit 17 includes hard disk, nonvolatile memory, and the like. The storage unit 17 stores various types of data such as image data in which metadata is stored, in addition to a computer program executed by the CPU 11. The communication unit 18 includes a network interface and the like, and communicates with an external device, which is not illustrated, via wireless or wired communication.

Figure 5:
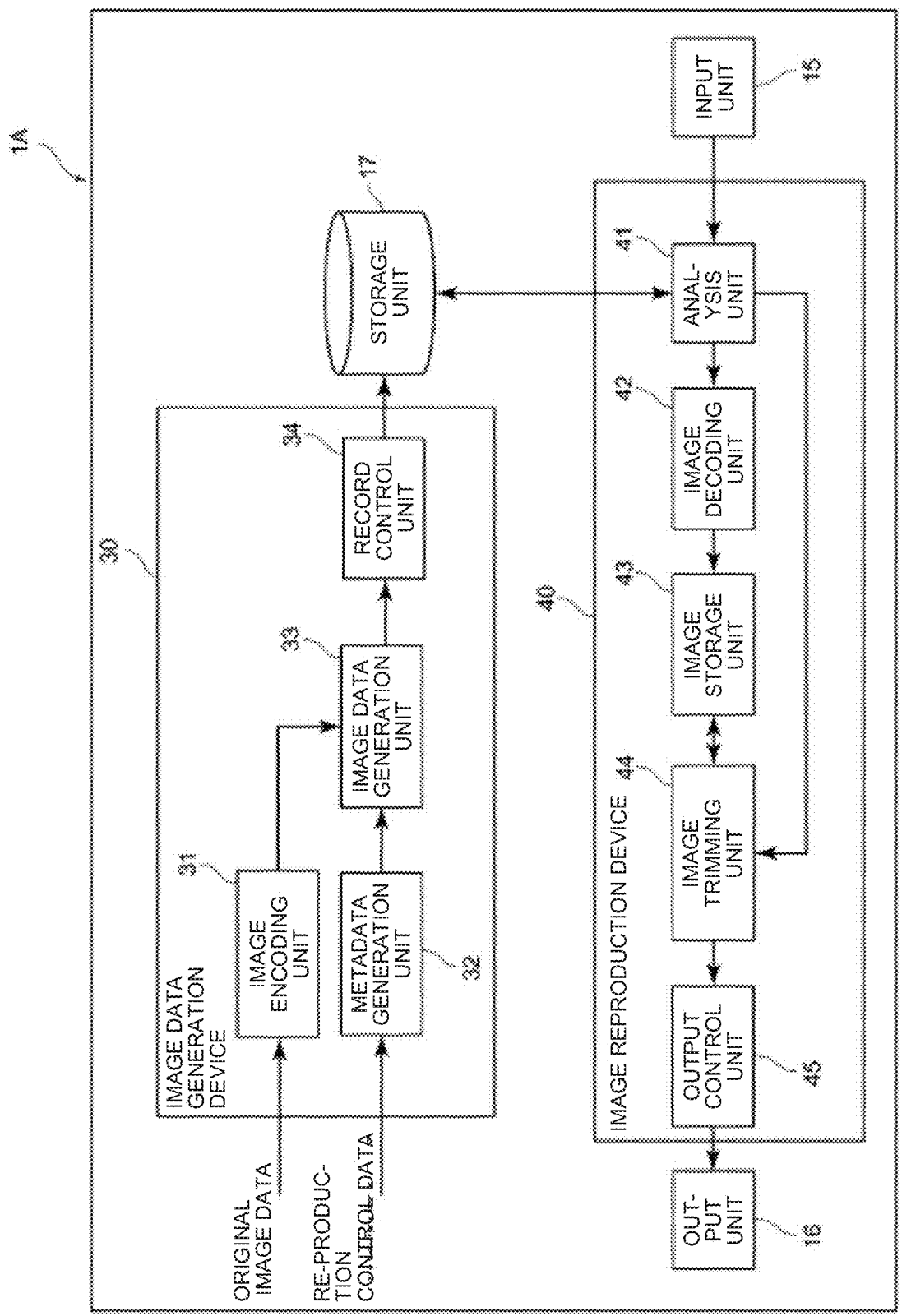
FIG. 5 is a diagram illustrating an example of a functional block configuration of an information processing device that executes an image reproduction process involving a trimming process.

FIG. 5 is an example of a functional block configuration of the information processing device 1 that executes an example of an image reproduction process for trimming an image serving as an information processing device 1A. The information processing device 1A includes an image data generation device 30 and an image reproduction device 40. The image data generation device 30 generates metadata, and generates image data in which the generated metadata is stored. The image reproduction device 40 reproduces an image on the basis of the metadata.

The image data generation device 30 includes an image encoding unit 31, a metadata generation unit 32, an image data generation unit 33, and a record control unit 34.

The image encoding unit 31 inputs original image data captured by a camera, or original image data created by image processing, and encodes the input original image data into JPEG XT format. The obtained image encoded data is supplied to the image data generation unit 33.

The metadata generation unit 32 inputs reproduction control data including trimming information in which time information and area information are formed as a set, and generates metadata defined in JPEG XT Part 3 Box file format that can be described using JSON. The generated metadata is supplied to the image data generation unit 33.

The image data generation unit 33 generates image data (FIG. 2) in which the image encoded data supplied from the image encoding unit 31, and the metadata supplied from the metadata generation unit 32 are stored. The generated image data is supplied to the record control unit 34.

The record control unit 34 supplies the image data including the image encoded data and the metadata supplied from the image data generation unit 33 to the storage unit 17. The record control unit 34 also controls recording of the image data in the storage unit 17.

The image reproduction device 40 includes an analysis unit 41, an image decoding unit 42, an image storage unit 43, an image trimming unit 44, and an output control unit 45.

On the basis of an instruction from the input unit 15, the analysis unit 41 acquires the image data from the storage unit 17, and analyzes the metadata stored in the acquired image data. The analysis unit 41 also supplies the image encoded data in JPEG XT format that is stored in the image data to the image decoding unit 42. The analysis unit 41 activates an internal timer, which is not illustrated, and controls the image trimming unit 44 on the basis of the time measured by the internal timer, and the trimming information including the time information that matches with the time measured by the internal timer, among a plurality of pieces of trimming information in which the time information and the area information described in the analyzed metadata are formed as a set. In other words, the analysis unit 41 controls the image trimming unit 44 so that a predetermined area of an image in the image indicated by the image data stored in the image storage unit 43 is sequentially trimmed at a prescribed timing, on the basis of the pieces of trimming information described in the metadata.

The image decoding unit 42 decodes the image encoded data in JPEG XT format supplied from the analysis unit 41. The obtained image decoded data is supplied to the image storage unit 43, and is temporality stored therein.

In the image decoded data stored in the image storage unit 43, the image trimming unit 44 trims a predetermined area of the image at a prescribed timing, on the basis of control performed by the analysis unit 41, and supplies decoded data that corresponds to the trimming image to the output control unit 45.

The output control unit 45 outputs (displays) the decoded data of a predetermined area of the image supplied from the image trimming unit 44 onto the display.

Operation of Information Processing Device in Example of Image Reproduction Process for Trimming Image A trimmed image display process of the information processing device 1A will now be described with reference to the flowchart in FIG. 6.

At step S1, the analysis unit 41 acquires image data from the storage unit 17, on the basis of an instruction from the input unit 15. At step S2, the analysis unit 41 analyzes the metadata stored in the image data, and supplies the image encoded data in JPEG XT format that is stored in the read image data to the image decoding unit 42.

At step S3, the image decoding unit 42 decodes the image encoded data supplied from the analysis unit 41, and acquires image decoded data. The image decoded data is supplied to the image storage unit 43, and is temporarily stored therein.

At step S4, the analysis unit 41 activates the internal timer. At step S5, the analysis unit 41 determines whether there is the time measured by the internal timer, and the trimming information including the time information that matches with the time measured by the internal timer, among a plurality of pieces of trimming information described in the analyzed metadata.

At step S5, when it is determined that there is trimming information including the time information that matches with the time measured by the internal timer (Yes at step S5), the analysis unit 41 controls the image trimming unit 44 on the basis of the trimming information including the time information that matches with the time measured by the internal timer.

At step S6, in the image decoded data stored in the image storage unit 43, the image trimming unit 44 retrieves image decoded data that corresponds to a predetermined area of the image on the basis of the area information associated with the time information, on the basis of control performed by the analysis unit 41, and supplies the data to the output control unit 45.

At step S7, the output control unit 45 outputs the image decoded data that corresponds to the predetermined area of the image supplied from the image trimming unit 44 onto the display. Then, the process returns to step S5, and the process described above is repeated until it is determined that there is no trimming information including the time information that matches with the time measured by the internal timer.

Figure 6:
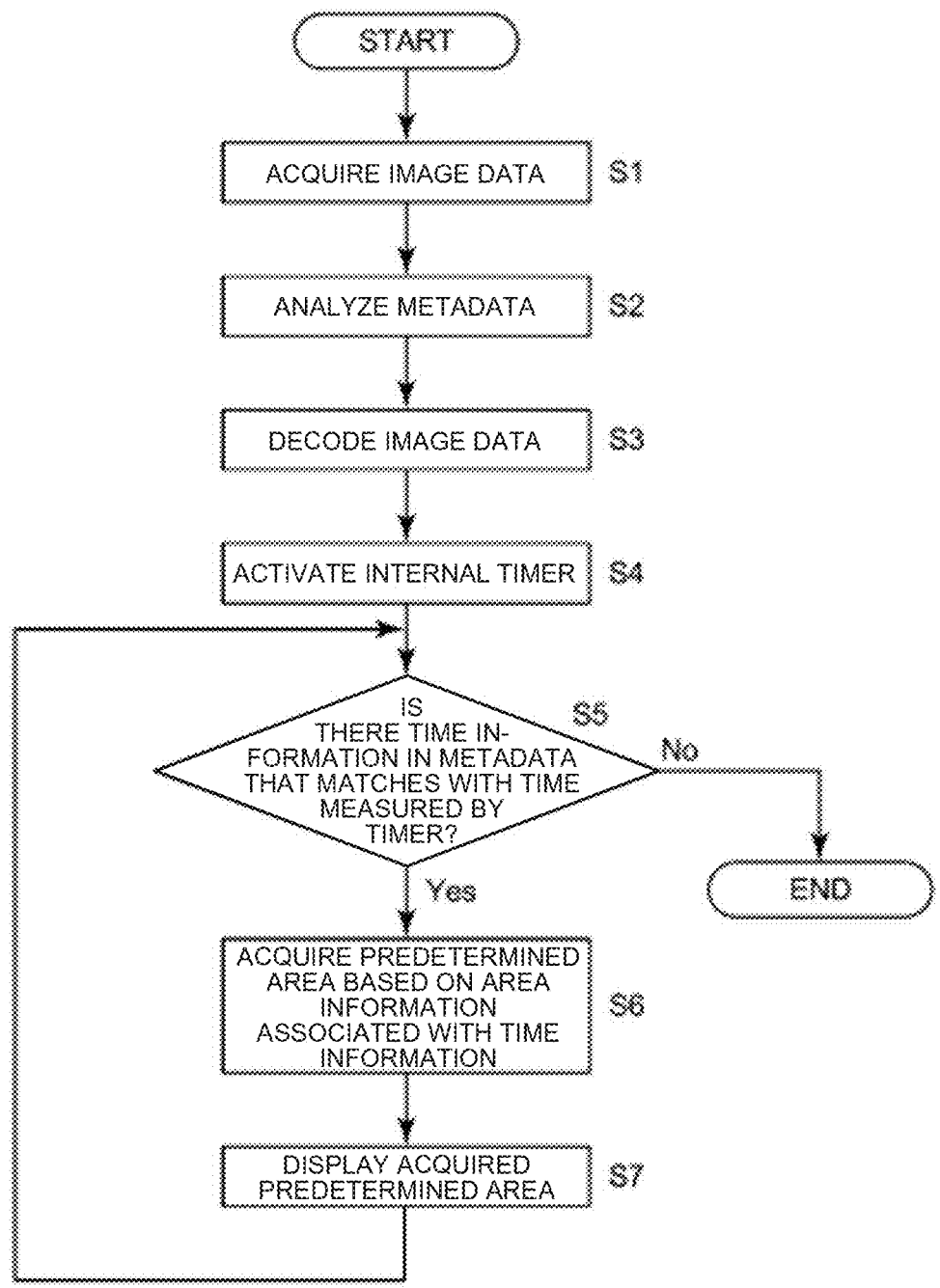
FIG. 6 is a flowchart illustrating a trimmed image display process.

Then, at step S5, when it is determined that there is no trimming information including the time information that matches with the time measured by the internal timer (No at step S5), the trimmed image display process illustrated in FIG. 6 will be finished.

In this manner, with the information processing device 1A illustrated in FIG. 5, it is possible to trim and sequentially display only a predetermined area of an image, by generating image data including data obtained by encoding an image and metadata that at least includes trimming information in which time information and area information are formed as a set, and on the basis of the area information associated with the time information, at a display timing that matches with the time information described in the metadata. Thus, the data control can be simplified, because the image data includes a display timing and data to be controlled. Moreover, the image area to be displayed and the reproduction timing of the image area can be easily changed by just editing the information in the metadata, without using a specific device or software. Consequently, it is possible to easily display an image corresponding to the reproduction elapsed time.

Moreover, the information processing device 1A may also include an audio data reproduction unit, and cause the storage unit 17 to store audio data in association with the image data. With such a configuration, when the image data is displayed, the information processing device 1A can reproduce the audio data associated with the image data. For example, when musical score data for piano is displayed, the information processing device 1A can also reproduce audio data of the piano performance, which will be a guide for the musical score. Consequently, the user can practice piano according to the guide performance. Moreover, when musical score data for piano is displayed, the information processing device 1A can reproduce audio data of violin performance on the basis of the musical score at the same time. Consequently, the user can enjoy playing duet with violin, by only playing piano.

Moreover, in the above, the information processing device 1A may also describe animation information in metadata that at least includes trimming information in which time information and area information are formed as a set. With such a configuration, when the image data is displayed, the information processing device 1A can also display an image based on the animation information associated with image data. For example, when a predetermined area of musical score data for piano is displayed, the information processing device 1A can also display an image of a guiding function (animation indicating which key to be pressed next) that allows the user to play the musical score with piano in a superposed manner. Consequently, the user can practice piano using the guiding function.

Example of Image Reproduction Process Accompanied by Reproduction of Audio (Example Using Lyrics Data)

Figure 7:
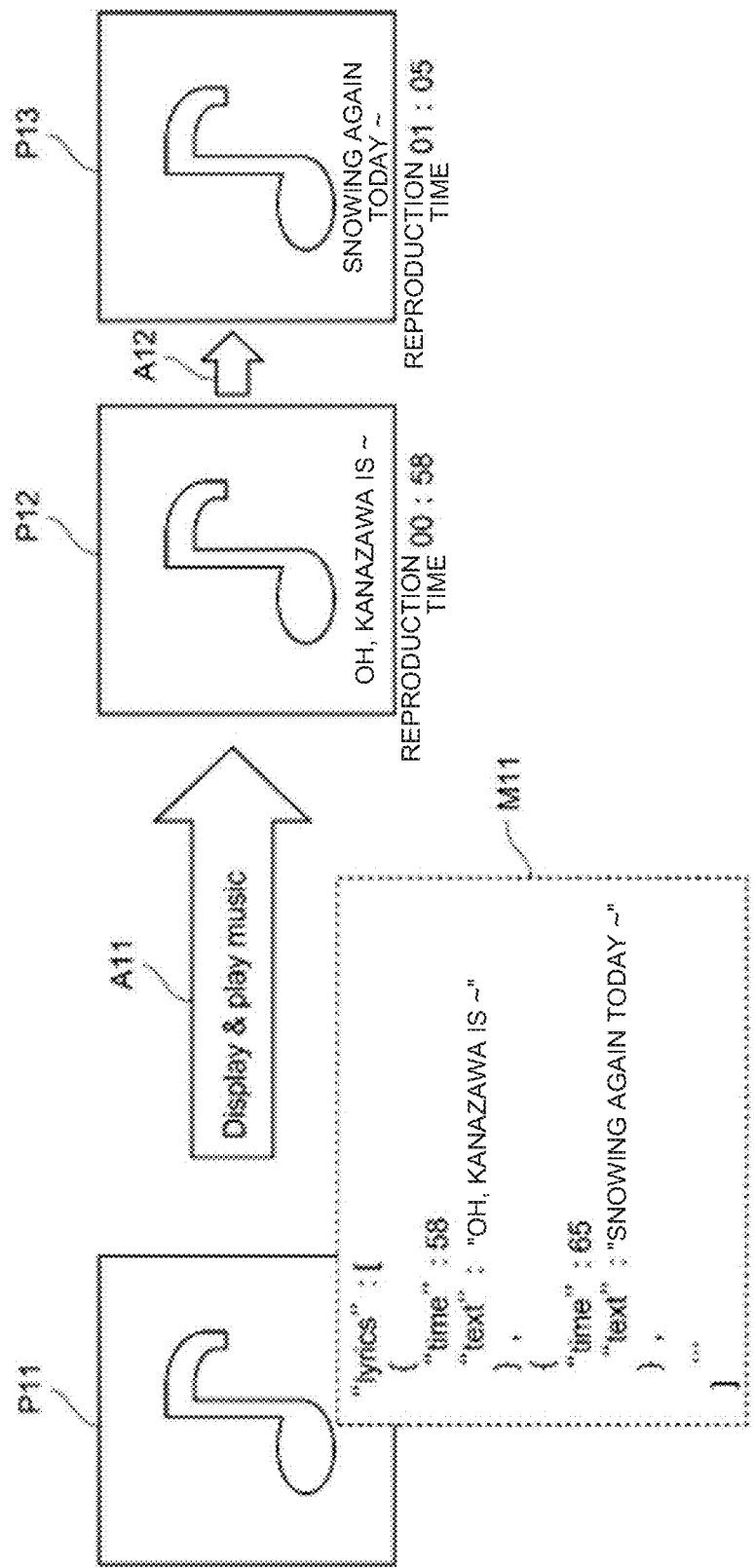
FIG. 7 is a diagram illustrating an example of displaying subtitles of lyrics according to a reproduction elapsed time.

FIG. 7 is a diagram illustrating an example of displaying subtitles of lyrics data according to a reproduction elapsed time of audio data. As illustrated in FIG. 7, image encoded data composed of artwork is stored in the original image data of image data P11. Metadata M11 described using JSON is stored in an area of APP11 of the image data P11. In the metadata M11, the first row contains "'lyrics': [", the second row contains "{", the third row contains "'time': 58", the fourth row contains "'text': 'Oh, Kanazawa is ~'", the fifth row contains "},", the sixth row contains "{", the seventh row contains "'time': 65", the eighth row contains "'text': 'snowing again today ~'", the ninth row contains "},", and the n-th row contains "]".

"'lyrics'" is information indicating to use a lyrics display function. Information described after "'time'" indicates time information, and information described after "'text'" indicates text data. In other words, the metadata M11 includes subtitle information in which time information and text data for displaying lyrics by the lyrics display function are formed as a set. By generating audio data embedded with the image data P11 in which the metadata M11 is stored, when the audio data is reproduced, the information processing device 1 can acquire the image data P11 embedded in the audio data. Moreover, by reading the metadata (subtitle information) M11 stored in the acquired image data P11, the information processing device 1 can sequentially display subtitles on the basis of the text data associated with the time information, corresponding to an elapsed time from the start of reproduction of audio data.

In the example in FIG. 7, when the audio data embedded with the image data P11 in which the metadata M11 such as above is stored is reproduced, "Oh, Kanazawa is ~" is read out during a period from when 58 seconds have passed since the reproduction start time up to 65 seconds. Consequently, as indicated by an arrow A11, a text of "Oh, Kanazawa is ~" is displayed on an image P12 as subtitles in a superposed manner.

Then, "snowing again today ~" is read out during a period from when 65 seconds have passed since the reproduction start time up to the next time information. Consequently, as indicated by an arrow A12, a text of "snowing again today ~" is displayed on an image P13 as subtitles in a superposed manner.

Details of an operation of displaying subtitles according to the reproduction elapsed time of audio data such as above will be described in detail below with reference to a flowchart.

Figure 8:
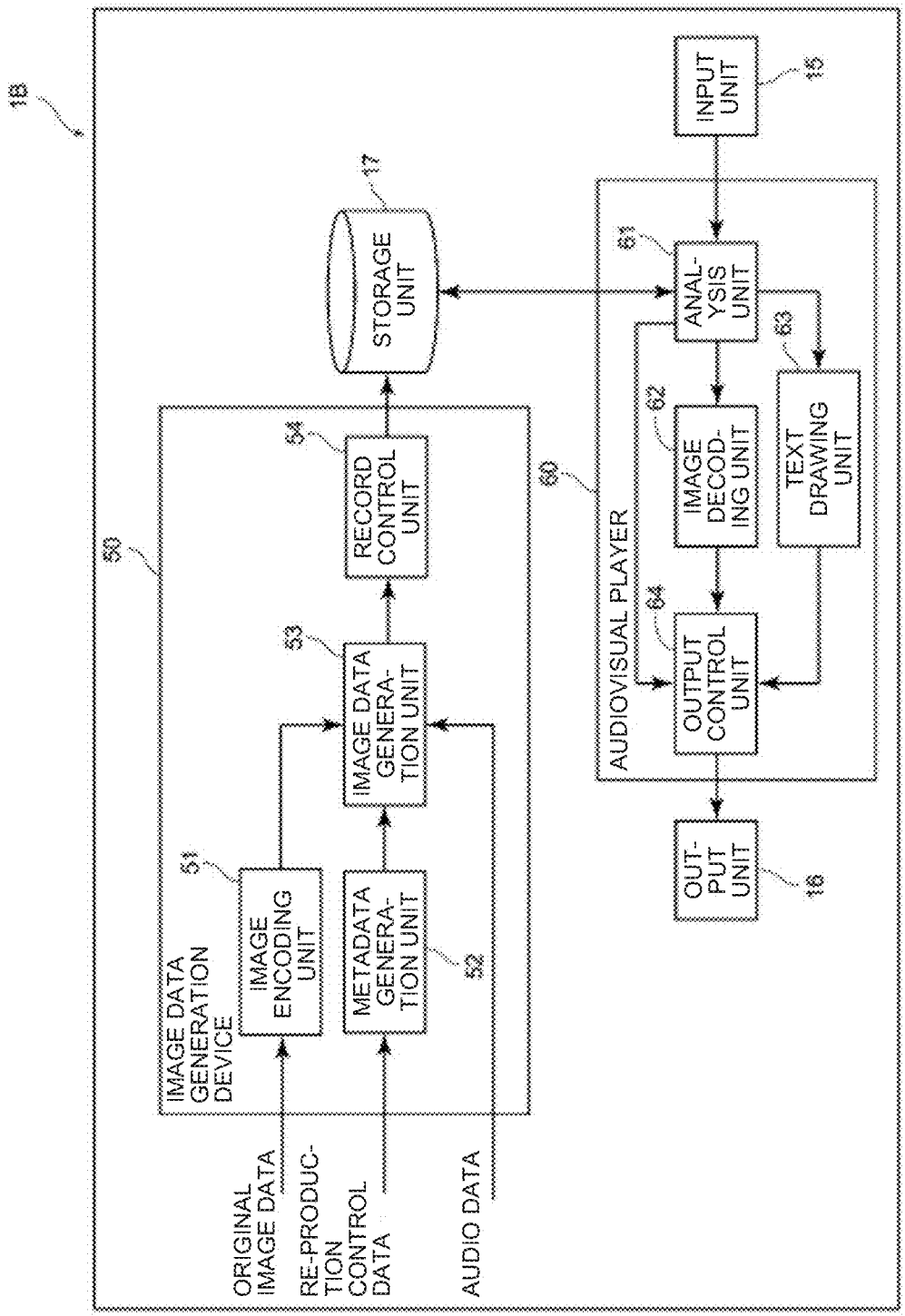
FIG. 8 is a diagram illustrating an example of a functional block configuration of an information processing device that executes an image reproduction process with reproduction of audio.

Example of Functional Configuration of Information Processing Device that Executes Example of Image Reproduction Process Accompanied by Reproduction of Audio A hardware configuration of an information processing device that executes an example of an image reproduction process accompanied by reproduction of audio described above is the same as that illustrated in FIG. 4. Consequently, the explanation thereof will be omitted. FIG. 8 is an example of a functional block configuration of the information processing device 1 that executes an example of an image reproduction process accompanied by reproduction of audio, serving as an information processing device 1B. The information processing device 1B includes a data generation device 50 and an audiovisual player 60. The data generation device 50 generates metadata, generates image data in which the generated metadata is stored, and generates audio data in which the generated image data is embedded. The audiovisual player 60 reproduces audio from the audio data, and reproduces an image from the image data on the basis of the metadata.

The data generation device 50 includes an image encoding unit 51, a metadata generation unit 52, a data generation unit 53, and a record control unit 54.

The image encoding unit 51 inputs original image data captured by a camera or original image data created by image processing, and encodes the input original image data into JPEG XT format. The encoded data is supplied to the data generation unit 53.

The metadata generation unit 52 inputs reproduction control data including subtitle information in which time information and text data are formed as a set, and generates metadata defined in JPEG XT Part 3 Box file format that can be described using JSON. The generated metadata is supplied to the data generation unit 53.

The data generation unit 53 generates image data (FIG. 2) in which the encoded data supplied from the image encoding unit 51, and the metadata supplied from the metadata generation unit 52 are stored. The data generation unit 53 externally inputs audio data, embeds the image data in which the metadata is stored in the input audio data, and supplies the data to the record control unit 54.

The record control unit 54 supplies the audio data that is supplied from the data generation unit 53, and in which the image data including the image encoded data and the metadata is embedded, to the storage unit 17. The record control unit 54 also controls recording of the audio data in the storage unit 17.

The audiovisual player 60 includes an analysis unit 61, an image decoding unit 62, a text drawing unit 63, and an output control unit 64.

The analysis unit 61 acquires audio data from the storage unit 17 on the basis of an instruction from the input unit 15, and supplies the acquired audio data to the output control unit 64. The analysis unit 61 also acquires image data embedded in the acquired audio data, and analyzes the metadata stored in the acquired image data. By the analysis, the image encoded data in JPEG XT format stored in the image data is supplied to the image decoding unit 62.

Moreover, the analysis unit 61 activates the internal timer, which is not illustrated, and controls the text drawing unit 63 on the basis of the time measured by the internal timer, and the subtitle information including the time information that matches with the time measured by the internal timer, among a plurality of pieces of subtitle information in which the time information and the text data described in the analyzed metadata are formed as a set. In other words, the analysis unit 61 controls the text drawing unit 63 so that the text data is sequentially turned into an image at a prescribed timing, on the basis of the pieces of subtitle information described in the metadata.

The image decoding unit 62 decodes the image encoded data in JPEG XT format supplied from the analysis unit 61. The decoded image data is supplied to the output control unit 64.

On the basis of control performed by the analysis unit 61, the text drawing unit 63 turns the text data supplied from the analysis unit 61 into image data at a prescribed timing, and supplies the data to the output control unit 64.

The output control unit 64 outputs and reproduces audio on the basis of the audio data supplied from the analysis unit 61 to the speaker, and superposes the image data supplied from the text drawing unit 63 on the image data supplied from the image decoding unit 62, and outputs (displays) the data onto the display.

Operation of Information Processing Device in Example of Image Reproduction Process Accompanied by Reproduction of Audio A subtitle display process of the information processing device 1B will now be described with reference to the flowchart in FIG. 9.

At step S11, on the basis of an instruction from the input unit 15, the analysis unit 61 acquires audio data from the storage unit 17. At step S12, the analysis unit 61 analyzes metadata of the image data embedded in the audio data. The acquired audio data is supplied to the output control unit 64, and the image encoded data in JPEG XT format stored in the analyzed metadata is supplied to the image decoding unit 62.

At step S13, the image decoding unit 62 generates image decoded data by decoding the image encoded data in JPEG XT format supplied from the analysis unit 61, and supplies the data to the output control unit 64. At step S14, the output control unit 64 outputs and reproduces audio on the basis of the audio data to the speaker.

At step S15, the analysis unit 61 activates the internal timer. At step S16, the analysis unit 61 determines whether there is the time measured by the internal timer, and the subtitle information including the time information that matches with the time measured by the internal timer, among the pieces of subtitle information described in the analyzed metadata.

At step S16, when it is determined that there is subtitle information including the time information that matches with the time measured by the internal timer (Yes at step S16), the analysis unit 61 controls the text drawing unit 63 on the basis of the subtitle information including the time information that matches with the time measured by the internal timer.

At step S17, on the basis of control performed by the analysis unit 61, the text drawing unit 63 turns the text data associated with the time information into image data, and supplies the data to the output control unit 64.

At step S18, the output control unit 64 superposes the text image data supplied from the text drawing unit 63 on the image data supplied from the image decoding unit 62, and displays and outputs the data. Then, the process returns to step S16, and the process described above is repeated, until it is determined that there is no subtitle information including the time information that matches with the time measured by the internal timer.

Figure 9:
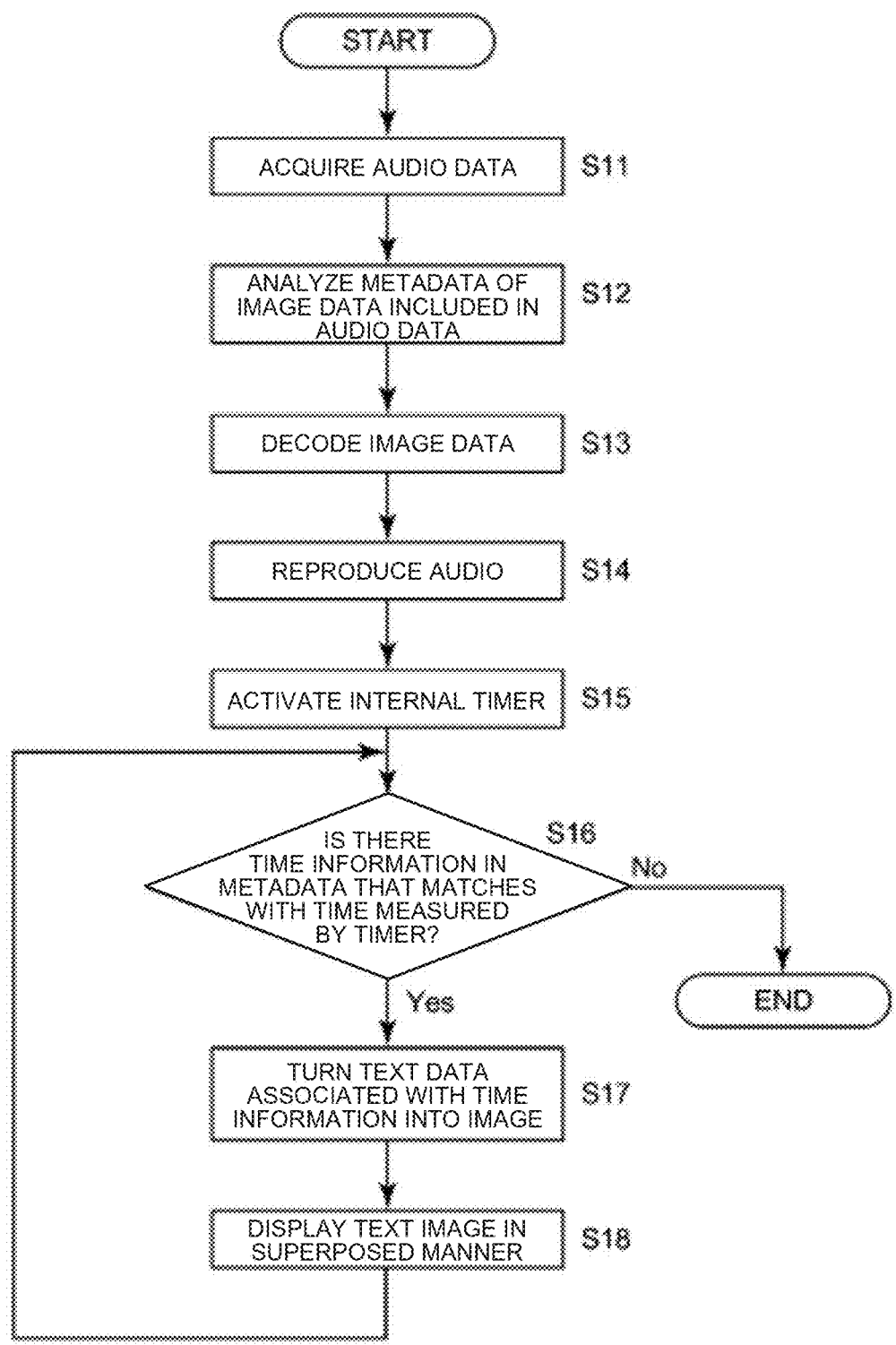
FIG. 9 is a flowchart illustrating a subtitle display process.

Then, at step S16, when it is determined that there is no subtitle information including the time information that matches with the time measured by the internal timer (No at step S16), the subtitle display process illustrated in FIG. 9 will be finished.

As described above, by generating audio data embedded with the image data including the encoded data and the metadata that at least includes the subtitle information in which time information and text data are formed as a set, when the audio data is reproduced, and at the display timing that matches with the time information described in the metadata of the image data embedded in the audio data, it is possible to turn the text data associated with the time information into image data, and display subtitles by superposing the obtained text image data on the image data.

Consequently, it is possible to easily display an image corresponding to the reproduction elapsed time of the audio data. Moreover, for example, because the image data, audio data, and text data described above can be controlled as a single music file, it is possible to easily handle data. Furthermore, because the subtitle information is stored in the text data, it is possible to easily edit subtitle time information.

In the above, the information processing device 1B may also describe color information, font information, information indicating the presence of shadow of the text, background color information, and the like on the metadata that at least includes the subtitle information in which time information and text data are formed as a set. With such a configuration, the information processing device 1B may not only display simple subtitles but also display visually enjoyable subtitles, when subtitles are displayed.

Example of Image Reproduction Process Accompanied by Detection of Alteration

Figure 10:
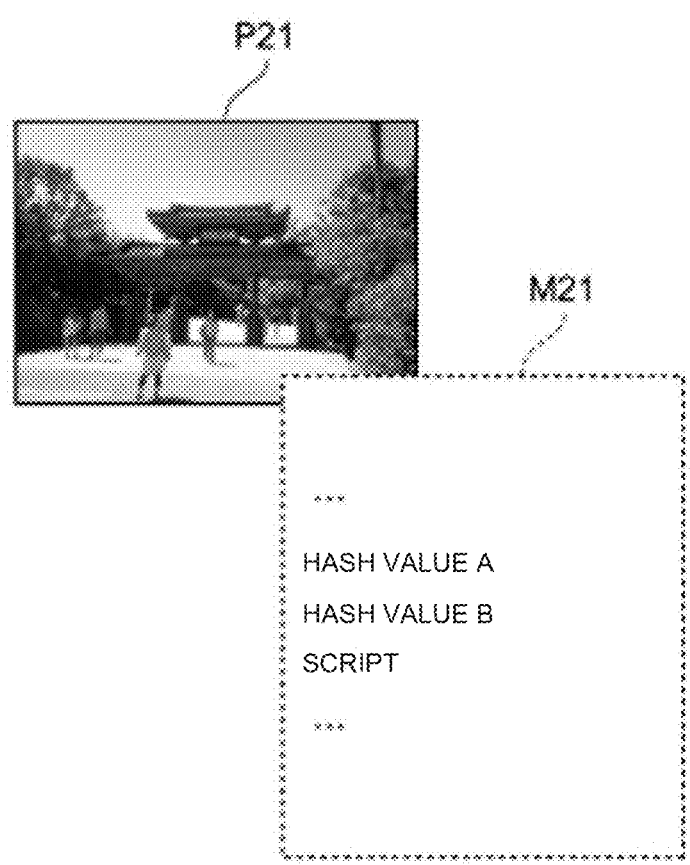
FIG. 10 is a diagram illustrating an embodiment of the present disclosure, and is a diagram illustrating an example of image data in which alteration detection data is described in metadata.

FIG. 10 is a diagram illustrating an embodiment of the present disclosure, and is a diagram illustrating an example of image data in which alteration detection data is described in metadata. As illustrated in FIG. 10, image encoded data in which the original image is a photograph is stored in the original image data of image data P21. Metadata M21 described using JSON is stored in an area of APP11 of the image data P21. A hash value A, a hash value B, and script are described in the metadata M21. The hash value A is a value obtained when the script is executed using seed data as an argument. The seed data is data (parameter) embedded in a predetermined area of the image data P21 in advance. The hash value B is a value obtained when the script is executed using a program character string in the script as an argument. The script is a hash function (computer program) for calculating a hash value. In other words, data for detecting alteration is described in the metadata M21, and the information processing device 1 can detect alteration of the image data P21, by reading the metadata (alteration detection data) M21 and executing the script.

Details of an operation of reading and executing the alteration detection data such as above will be described below with reference to a flowchart.

Figure 11:
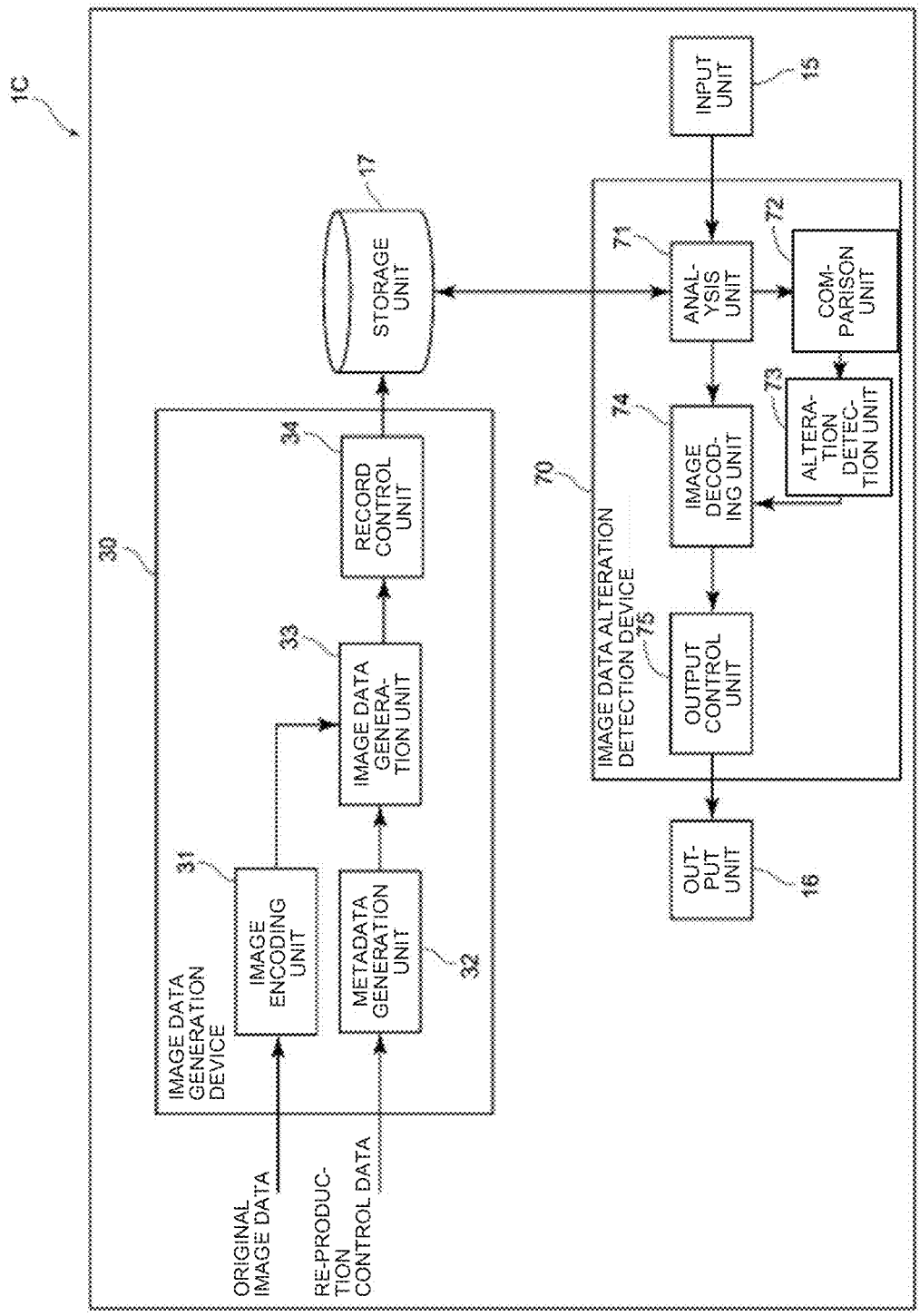
FIG. 11 is a diagram illustrating the embodiment of the present disclosure, and is a diagram illustrating an example of a functional block configuration of an information processing device that executes an example of an image reproduction process involving detection of an alteration.

Example of Functional Configuration of Information Processing Device that Executes Example of Image Reproduction Process Accompanied by Detection of Alteration A hardware configuration of an information processing device that executes an example of an image reproduction process accompanied by detection of alteration is the same as that illustrated in FIG. 4. Consequently, the explanation thereof will be omitted. FIG. 11 is an example of a functional block configuration of the information processing device 1 that executes an example of an image reproduction process accompanied by detection of alteration serving as an information processing device 1C. In FIG. 11, the same reference numerals denote the components the same as those in FIG. 5, and the repeated description thereof are omitted as appropriate. The information processing device 1C includes the image data generation device 30 and an image data alteration detection device 70. The image data generation device 30 generates metadata, and generates image data in which the generated metadata is stored. The image data alteration detection device 70 detects whether the image data in which the metadata is stored is altered, and reproduces the image data when the image data is not altered.

The metadata generation unit 32 inputs reproduction control data including the hash value A, the hash value B, and the script for detecting alteration, and generates metadata defined in JPEG XT Part 3 Box file format that can be described using JSON. The generated metadata is supplied to the image data generation unit 33.

The image data alteration detection device 70 includes an analysis unit 71, a comparison unit 72, an alteration detection unit 73, an image decoding unit 74, and an output control unit 75.

On the basis of an instruction from the input unit 15, the analysis unit 71 acquires image data from the storage unit 17, analyzes the metadata stored in the acquired image data, and supplies the alteration detection data (hash value A, hash value B, and script) described in the metadata to the comparison unit 72. The analysis unit 71 also supplies the encoded data in JPEG XT image format stored in the image data to the image decoding unit 74. The analysis unit 71 reads out the seed data embedded in the image data using a predetermined method, and supplies the data to the comparison unit 72.

The comparison unit 72 calculates a hash value A' on the basis of the script and the seed data included in the alteration detection data supplied from the analysis unit 71, and compares the calculated hash value A' with the hash value A described in the metadata (alteration detection data). Moreover, the comparison unit 72 calculates a hash value B' on the basis of the program character string in the script included in the alteration detection data, and compares the calculated hash value B' with the hash value B described in the metadata (alteration detection data). The comparison results are supplied to the alteration detection unit 73.

On the basis of the two comparison results of the comparison unit 72, the alteration detection unit 73 detects whether the image data is altered, and when it is determined that the image data is not altered (the hash value A and the hash value B are both correct), the alteration detection unit 73 causes the image decoding unit 74 to execute a decoding process. When it is detected that the image data is altered (one or both of the hash value A and the hash value B are not correct), the alteration detection unit 73 prohibits the image decoding unit 74 to execute the decoding process.

On the basis of control performed by the alteration detection unit 73, when an execution of the decoding process is instructed, the image decoding unit 74 decodes the image encoded data in JPEG XT format supplied from the analysis unit 71, and supplies the data to the output control unit 75 as the image decoded data. On the basis of control performed by the alteration detection unit 73, when the decoding process is prohibited, the image decoding unit 74 does not decode the image encoded data in JPEG XT format supplied from the analysis unit 71, and supplies the data to the output control unit 75.

The output control unit 75 outputs (displays) the data supplied from the image decoding unit 74 onto the display.

Figure 12:
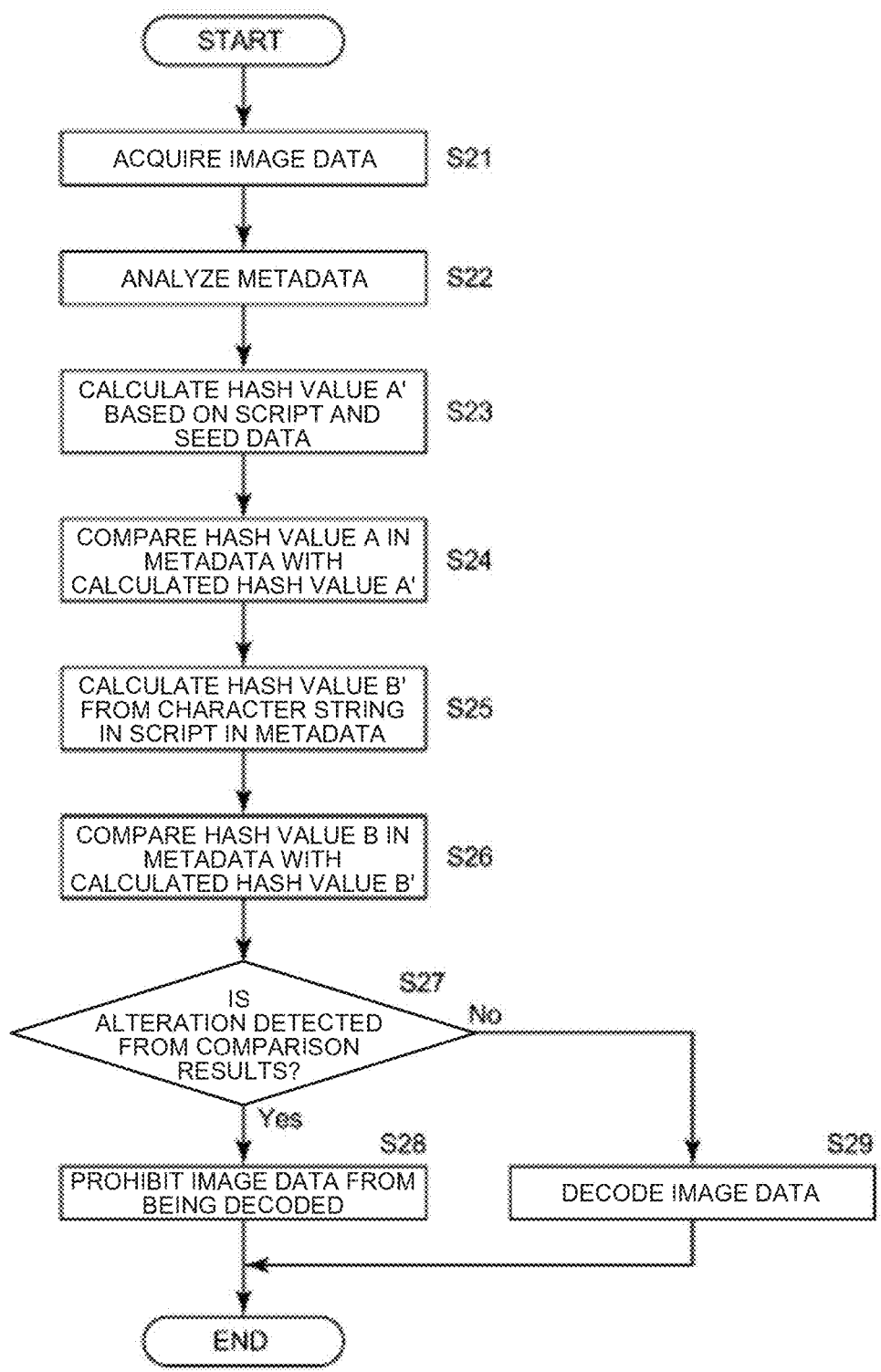
FIG. 12 is a flowchart illustrating an alteration detection process.

Operation of Information Processing Device in Example of Image Reproduction Process Accompanied by Detection of Alteration An alteration detection process of the information processing device 1C in an example of the image reproduction process accompanied by detection of alteration having the configuration such as above will be described with reference to the flowchart in FIG. 12.

At step S21, the analysis unit 71 acquires image data from the storage unit 17, on the basis of an instruction from the input unit 15. At step S22, the analysis unit 71 analyzes the metadata stored in the image data, and supplies the alteration detection data (hash value A, hash value B, and script) described in the metadata to the comparison unit 72. The analysis unit 71 also supplies the image encoded data in JPEG XT format stored in the read image data to the image decoding unit 74. Moreover, the analysis unit 71 reads out the seed data embedded in the image data using a predetermined method, and supplies the data to the comparison unit 72.

At step S23, the comparison unit 72 executes the script described in the metadata (alteration detection data) using the seed data supplied from the analysis unit 71 as an argument, and calculates the hash value A'. At step S24, the comparison unit 72 compares the hash value A described in the metadata (alteration detection data) with the calculated hash value A'.

At step S25, the comparison unit 72 executes the script using the program character string in the script described in the metadata (alteration detection data) as an argument, and calculates the hash value B'. At step S26, the comparison unit 72 compares the hash value B described in the metadata (alteration detection data) with the calculated hash value B'.

The comparison results at step S24 and step S26 are supplied to the alteration detection unit 73.

At step S27, the alteration detection unit 73 determines whether the image data is altered from the two comparison results. When one or both of the comparison results are different, the alteration detection unit 73 determines that the image data is altered (Yes at step S27), and at step S28, prohibits the decoding process of the image decoding unit 74. Consequently, the image decoding unit 74 does not decode the image encoded data in JPEG XT format supplied from the analysis unit 71, and supplies the data to the output control unit 75. The output control unit 75 then outputs (displays) the data supplied from the image decoding unit 74 onto the display.

At step S27, when the two comparison results are the same, the alteration detection unit 73 determines that the image data is not altered (No at step S27). Then, at step S29, the alteration detection unit 73 causes the image decoding unit 74 to execute the decoding process. The image decoding unit 74 decodes the image encoded data in JPEG XT format supplied from the analysis unit 71, and supplies the data to the output control unit 75 as the image decoded data. The output control unit 75 outputs (displays) the image decoded data supplied from the image decoding unit 74 onto the display.

As described above, by generating image data including the encoded data and the metadata that at least includes the alteration detection data, reading out the alteration detection data described in the metadata, and executing the script, it is possible to easily detect whether the image data is altered. When it is determined that the image data is altered, it is possible to prohibit the decoding process. Consequently, compared to the conventional alteration detection method using the hash value, the script for calculating the hash value is supplied with the image data. Thus, it is possible to easily detect alteration. Moreover, when alteration is attempted, because the calculation method of a hash value can be changed for each image data, it is difficult to uniquely alter the image data. Thus, it is not possible to establish the alteration method. Moreover, it is possible to easily verify the alteration made on the image data generated by the other data provider.

In the above, the seed data is embedded in a predetermined area of the image data P21 in advance. However, it is not limited thereto, and the seed data may be unified by the same standard that handles data or the like, or the seed data may be stored in the metadata.

Moreover, the hash value B' calculated at step S25 is obtained by executing the script by using the program character string in the script as an argument. However, the hash value B' may also be obtained by executing the script using the program character string in the script and the seed data as arguments.

Modifications

First Modification

The information processing devices 1A, 1B, and 1C may also generate image data including image encoded data and metadata having a character string such as a place name that is selectively displayed according to the positional information on the map and the set language. Consequently, when an image is displayed on the basis of the image data, the information processing devices 1A, 1B, and 1C can acquire the character string associated with the language set in the information processing devices 1A, 1B, and 1C in the metadata stored in the image data, and display the acquired character string at a predetermined position in a superposed manner.

Figure 13:
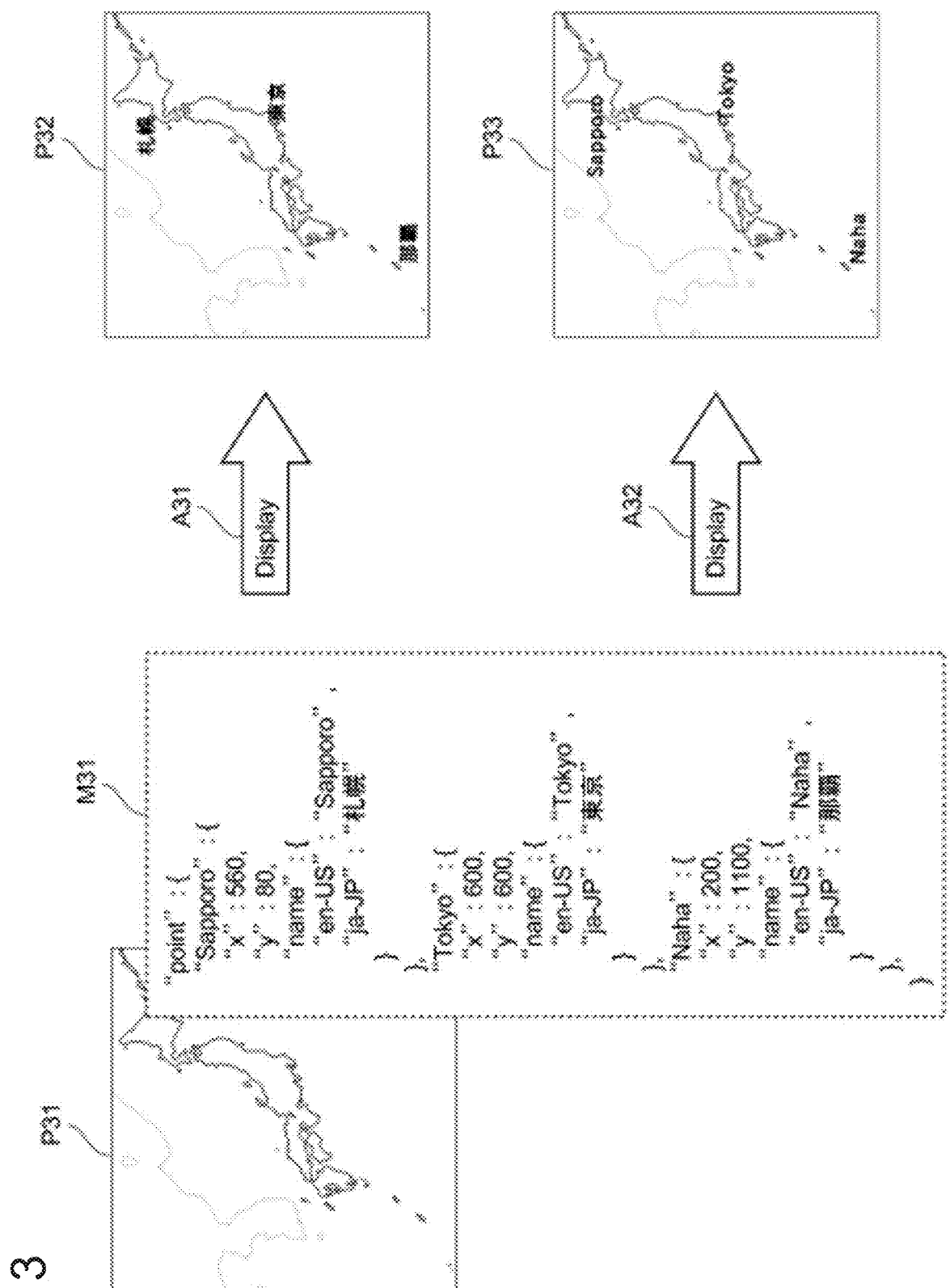
FIG. 13 is a diagram illustrating a processing example, when the original image is a map image, and when metadata includes a character string such as name of place that is selectively displayed according to the position on the map and the set language.

FIG. 13 is a diagram illustrating a usage example of image data including image encoded data and metadata having a character string such as a place name that is selectively displayed according to the position on the map and the set language.

As illustrated in FIG. 13, original image data of image data P31 stores image encoded data in which an original image of a map of Japan is encoded. Metadata M31 described using JSON is stored in an area of APP11 in the image data P31. In the metadata M31, the first row contains "'point': {", the second row contains "'Sapporo': {", the third row contains "'x': 560,", the fourth row contains "'y': 80,", the fifth row contains "'name': {", the sixth row contains "'en-US': 'Sapporo',", the seventh row contains "'ja-JP': '札幌'", the eighth row contains "}", the ninth row contains "},", the tenth row contains "'Tokyo': {", the eleventh row contains "'x': 600,", the twelfth row contains "'y': 600,", the thirteenth row contains "'name': {", the fourteenth row contains "'en-US': 'Tokyo',", the fifteenth row contains "'ja-JP': '東京'", the sixteenth row contains "}", the seventeenth row contains "},", the eighteenth row contains "'Naha': {", the nineteenth row contains "'x': 200,", the twentieth row contains "'y': 1100,", the twenty-first row contains "'name': {", the twenty-second row contains "'en-US': 'Naha',", the twenty-third row contains "'ja-JP': '那覇'", the twenty-fourth row contains "}", the twenty-fifth row contains "},", and the twenty-sixth row contains "}".

"'point'" is information indicating to use a function of pointing a specific position on the screen. Information described after "'x'" and "'y'" of "'Sapporo'", "'Tokyo'", and "'Naha'" each indicate the coordinate information of the place name (position) on the map. Information described after "'name'" indicates language, and information described after "'en-US'" indicates the place name to be displayed when the language is set. Moreover, information described after "'ja-JP'" indicates the place name (character string) to be displayed when the language is set. In other words, the metadata M31 includes place name information in which the coordinate information, the set language, and the place name that are used for displaying the place name in a predetermined language by a function of pointing a specific position on the screen are formed as a set. The information processing devices 1A, 1B, and 1C can display the place name according to the predetermined language set for the terminal at a predetermined position in a superposed manner, by reading out the metadata (place name information), when the image data is displayed.

In the example in FIG. 13, when an image is displayed on the basis of the image data P31 in which the metadata M31 such as above is stored, and when the language of the information processing devices 1A, 1B, and 1C is set to Japanese, Japanese notation of the place names (札幌, 東京, 那覇) subsequent to "'ja-JP'" in the metadata M31 will be read out. Consequently, as indicated by an arrow A31, the information processing devices 1A, 1B, and 1C display the place names in Japanese on predetermined positions of a map of Japan display P32 in a superposed manner. Moreover, when the language of the information processing devices 1A, 1B, and 1C is set to English, the place names (Sapporo, Tokyo, and Naha) subsequent to "'en-US'" in the metadata M31 will be read out. Consequently, as indicated by an arrow A32, the information processing devices 1A, 1B, and 1C display the place names in English on predetermined positions of a map of Japan display P33 in a superposed manner.

In this manner, with the first modification, by generating the image data including the image encoded data and the metadata having a character string such as a place name that is selectively displayed according to the positional information on the map and the set language, when an image is displayed on the basis of the image data, it is possible to display the place names associated with the language set for the information processing devices 1A, 1B, and 1C at predetermined positions in a superposed manner, on the basis of the place name information described in the metadata.

Second Modification

The information processing devices 1A, 1B, and 1C may also generate image data including image encoded data and metadata having a character string such as address or name of facility of the photographing location of the image. Consequently, the information processing devices 1A, 1B, and 1C can acquire the character string in the metadata stored in the image data, and display the acquired character string on the image in a superposed manner, when the image is displayed. Moreover, the information processing devices 1A, 1B, and 1C can search an image using the character string in the metadata stored in the image data as a search key.

Figure 14:
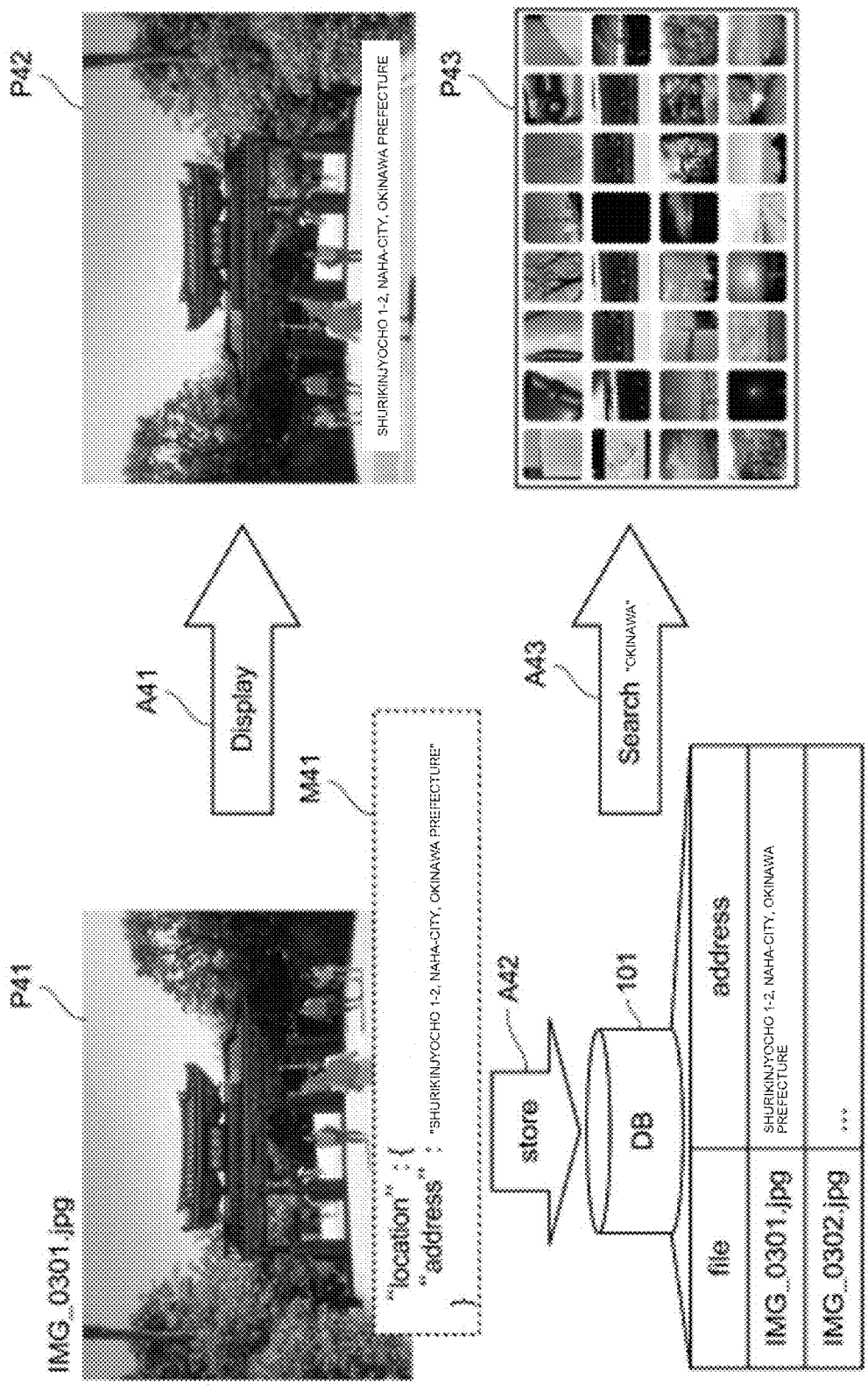
FIG. 14 is a diagram illustrating a processing example, when the original image is a photograph, and when metadata includes a character string such as address or name of facility of a photographing location of the photograph.

FIG. 14 is a diagram illustrating a usage example of image data including image encoded data and metadata having a character string such as address or name of facility of a photographing location of the image.

As illustrated in FIG. 14, a photograph captured in Okinawa is encoded and stored in the original image data of image data P41, as image encoded data. Metadata M41 described using JSON is stored in an area of APP11 of the image data P41. In the metadata M41, the first row contains "'location': {", the second row contains "'address': 'Shurikinjyocho 1-2, Naha-city, Okinawa prefecture'", and the third row contains "}".

"'location'" is information indicating to use a function capable of specifying the current position and linking with service. Information described after "'address'" indicates the address of the photographing location. In other words, the metadata M41 includes information indicating the address of the photographing location, and the information processing devices 1A, 1B, and 1C can display the information indicating the address of the photographing location described in the metadata in a superposed manner, by reading out the metadata when the image is displayed.

In the example in FIG. 14, when an image is displayed on the basis of the image data P41 in which the metadata M41 such as above is stored, the character string (Shurikinjyocho 1-2, Naha-city, Okinawa prefecture) subsequent to "'address'" in the metadata M41 is read out. Consequently, as indicated by an arrow A41, the information processing devices 1A, 1B, and 1C display the address of the photographing location on an image display P42 in a superposed manner.

Moreover, as indicated by an arrow A42, the information processing devices 1A, 1B, and 1C can supply the image data P41 in which the metadata M41 such as above is stored to database (DB) 101 connected via a network, which is not illustrated, and control the image data P41 therein. Consequently, when an image is searched using "Okinawa" as a search key, the information processing devices 1A, 1B, and 1C can search the image data including "Okinawa" in the metadata M41, from a plurality of pieces of image data controlled by the database 101. Then, as indicated by an arrow A43, the information processing devices 1A, 1B, and 1C can display an image list P43 including a plurality of thumbnail images of the searched image data.

In this manner, with the second modification, by generating the image data including the image encoded data and the metadata having a character string such as address or name of facility of the photographing location, when the image is displayed, the address, the name of facility, or the like of the photographing location stored in the image data can be displayed in a superposed manner. Moreover, by controlling the generated image data by database, the image data in which the metadata including a search key is stored can be easily searched, by specifying the search key.

Third Modification

The information processing devices 1A, 1B, and 1C may also generate image data including image encoded data and metadata having text data indicating the content of the image encoded data. Consequently, the information processing devices 1A, 1B, and 1C can acquire text data in the metadata stored in the image data, convert the acquired text data to audio by a text reading function, and reproduce the converted audio, when the image is displayed on the basis of the image data.

Figure 15:
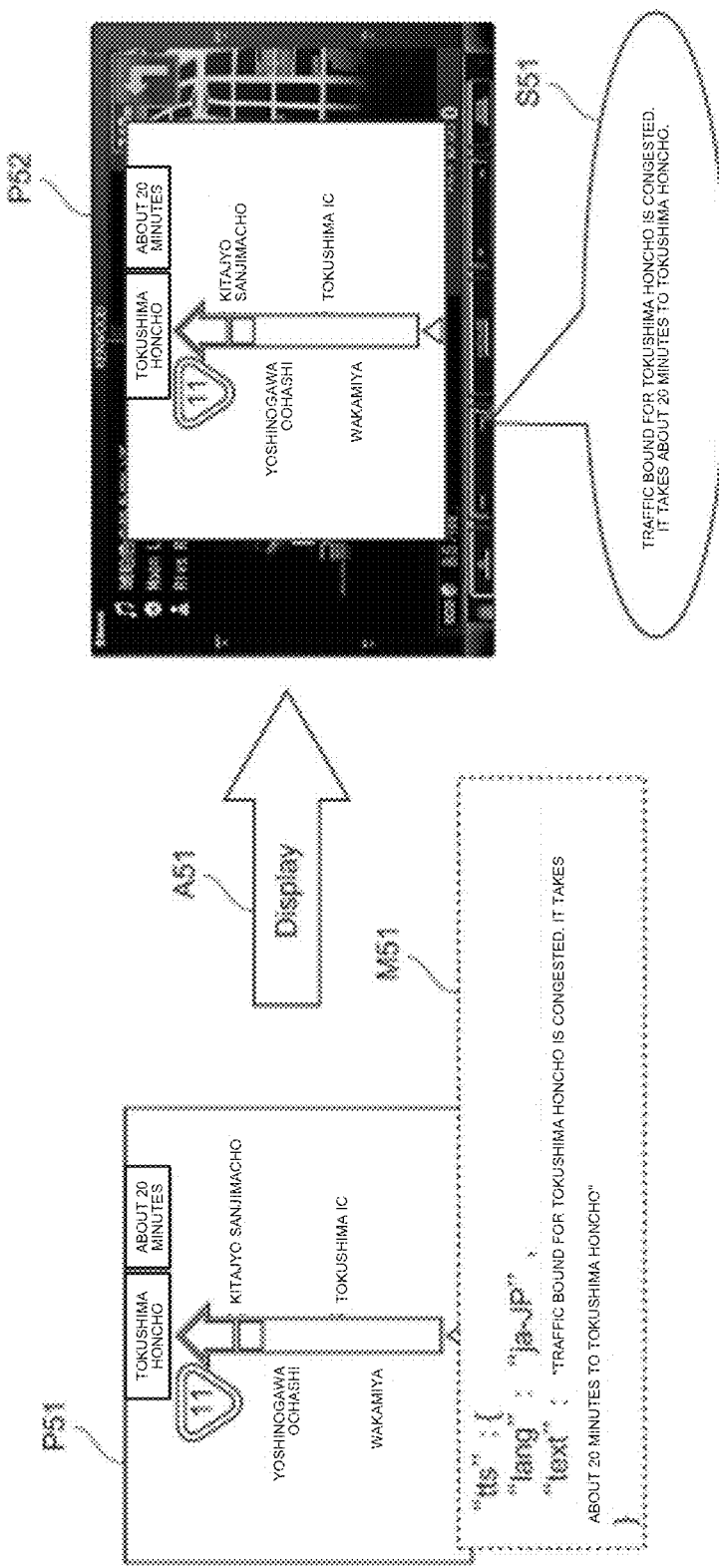
FIG. 15 is a diagram illustrating a processing example, when the original image is an image of a road guide sign, and when metadata includes text data indicating the contents of the road guide sign.

FIG. 15 is a diagram illustrating a usage example of image data including image encoded data and metadata having text data indicating the content of the image encoded data.

As illustrated in FIG. 15, data of a navigation image to be displayed on a car navigation system is stored in the original image data of image data P51, as image encoded data. Metadata M51 described using JSON is stored in an area of APP11 of the image data P51. In the metadata M51, the first row contains "'tts': {", the second row contains "'lang': 'ja-JP',", the third and fourth rows contain "'text': 'Traffic bound for Tokushima Honcho is congested. It takes about 20 minutes to Tokushima Honcho.'", and the fifth row contains "}".

"'tts'" is information indicating to use a text reading function called text-to speech (tts) system. Information described after "'lang'" indicates the language specified when the text reading function is used.

Information described after "'text'" indicates the text data read out when the tts system is used. In other words, the metadata M51 includes text data for reading out in Japanese by the text reading function. Consequently, the information processing devices 1A, 1B, and 1C can reproduce audio on the basis of the text data described in the metadata, by reading out the metadata when the image data is displayed.

In the example in FIG. 15, when the image is displayed on the basis of the image data P51 in which the metadata M51 such as above is stored, the text data (Traffic bound for Tokushima Honcho is congested. It takes about 20 minutes to Tokushima Honcho) subsequent to "'text'" in the metadata M51 is read out. Consequently, as indicated by an arrow A51, the information processing devices 1A, 1B, and 1C can display an image P52, and reproduce (read out) audio on the basis of the text indicated in a balloon S51, by using the text reading function.

In this manner, with the third modification, by generating image data including the image encoded data and the metadata having the text data indicating the content of the image encoded data, when the image is displayed on the basis of the image data, it is possible to reproduce audio on the basis of the text data stored in the image data.

Fourth Modification

The information processing devices 1A, 1B, and 1C may also generate image data including image encoded data encrypted by a public key, and metadata in which the public key is stored. Consequently, the information processing devices 1A, 1B, and 1C can acquire the public key in the metadata stored in the image data, when the image is displayed, and decode and display the image encoded data, only when the information processing devices 1A, 1B, and 1C have a secret key that links to the acquired public key.

Figure 16:
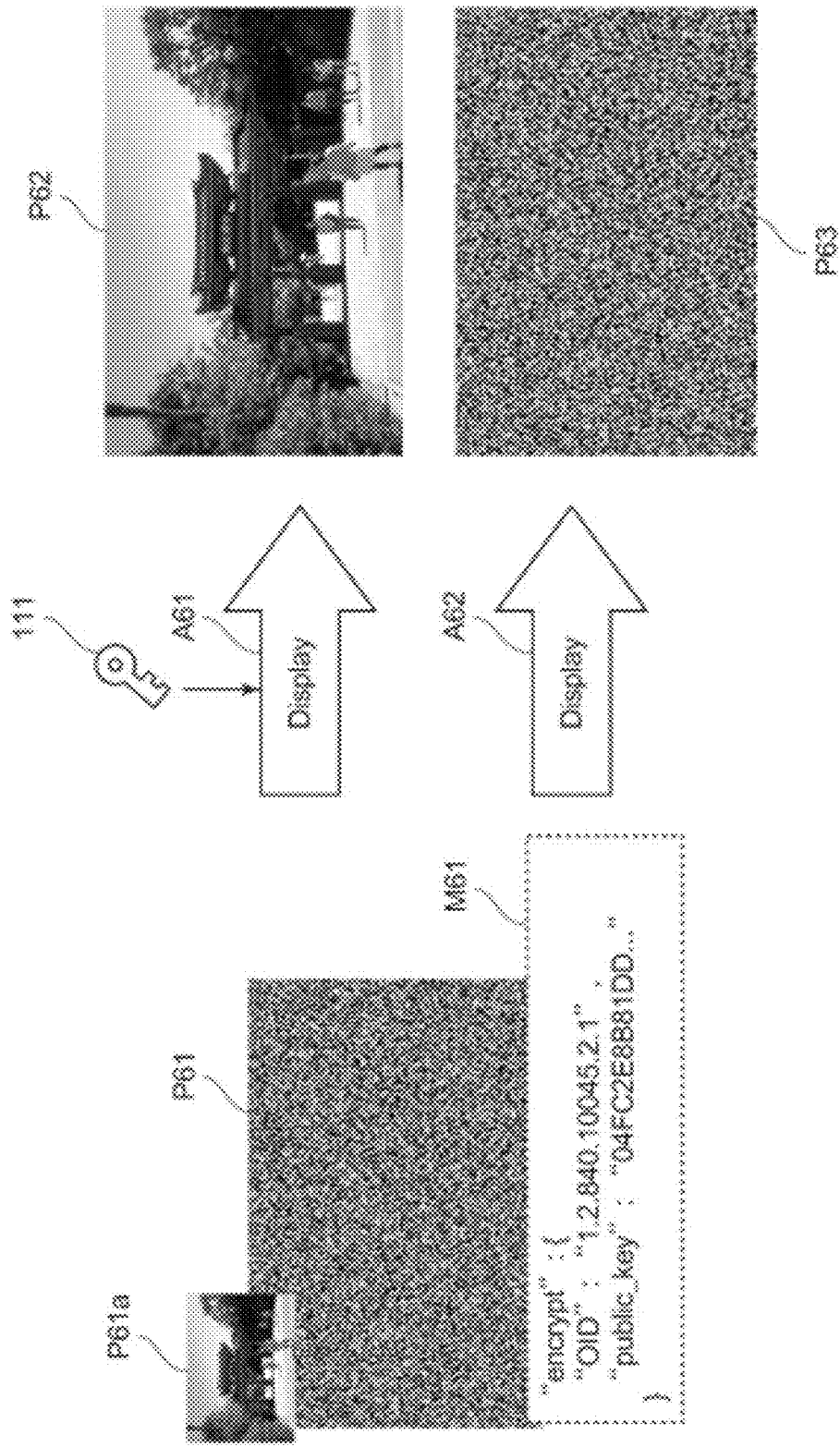
FIG. 16 is a diagram illustrating a processing example, when the original image data is encrypted by a public key, and when metadata stores the public key.

FIG. 16 is a diagram illustrating a usage example of image data including image encoded data encrypted by a public key, and metadata in which the public key is stored.

As illustrated in FIG. 16, the image encoded data encrypted by a public key is stored in the original image data of image data P61. Metadata M61 described using JSON is stored in an area of APP11 of the image data P61. A thumbnail image P61a in a plain text is also stored in an area of APP1 (Exif) of the image data P61. In the metadata M61, the first row contains "'encrypt': {", the second row contains "'OID': '1.2.840.10045.2.1',", the third row contains "'public_key': '04FC2E8B81DD . . . '", and the fourth row contains "}".

"'encrypt'" is information indicating to use the encryption function. Information described after "'OID'" indicates information for identifying an object, and information described after "'public_key'" indicates a public key. In other words, the metadata M61 includes the public key used for encrypting the image encoded data. The information processing devices 1A, 1B, and 1C can decode and display the image encoded data in the image data P61, by reading out the metadata when the image is displayed, and only when the information processing devices 1A, 1B, and 1C have a secret key that links to the public key described in the metadata.

In the example in FIG. 16, when an image is displayed on the basis of the image data P61 in which the metadata M61 such as above is stored, the public key (04FC2E8B81DD . . . ) subsequent to "'public_key'" in the metadata M61 is read out. Consequently, when the information processing devices 1A, 1B, and 1C include a secret key 111 that links to the read public key, the information processing devices 1A, 1B, and 1C decode (decipher) the image encoded data in the image data P61 using the secret key 111, and as indicated by an arrow A61, display an image P62.

Moreover, when the information processing devices 1A, 1B, and 1C do not include the secret key 111 that links to the public key read out from the metadata M61, the information processing devices 1A, 1B, and 1C cannot decode the image encoded data in the image data P61, and as indicated by an arrow A62, display data P63 remained encrypted.

In this manner, with the fourth modification, by generating the image data including the image encoded data encrypted by the public key and the metadata in which the public key is stored, when the image is displayed, the information processing devices 1A, 1B, and 1C can decode and display the encrypted image encoded data, only when the information processing devices 1A, 1B, and 1C include the secret key that links to the public key in the metadata stored in the image data.

Fifth Modification

The information processing devices 1A, 1B, and 1C may also generate image data including image encoded data and metadata having object (for example, facility) information identified on the basis of the photographing position of the original image, direction, angle of view, and map information. Consequently, the information processing devices 1A, 1B, and 1C can search an image using the object information of the metadata stored in the image data as a search key.

Figure 17:
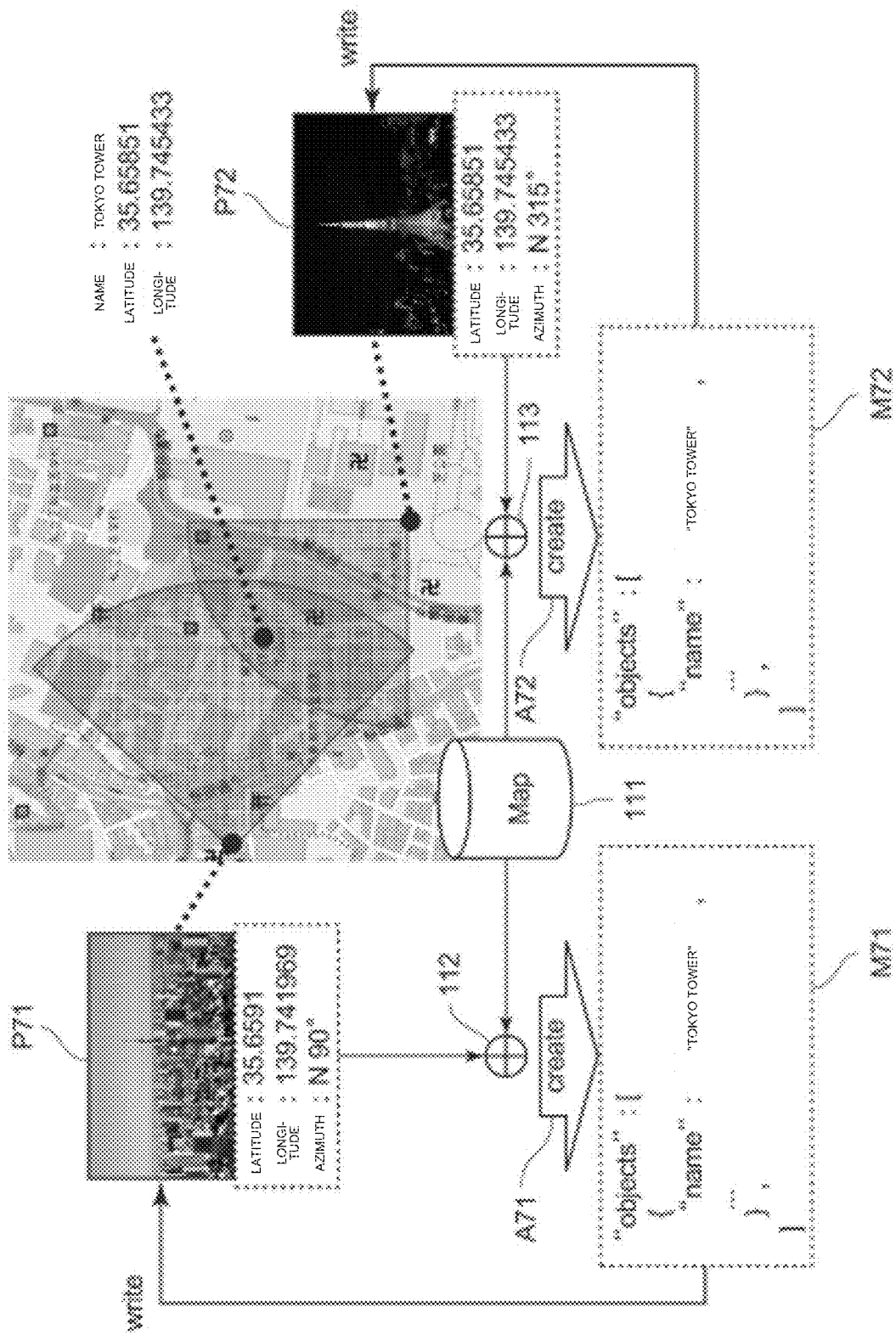
FIG. 17 is a diagram illustrating a processing example, when the original image is a landscape photograph, and when metadata includes object information such as positional information of a building and the like in the photograph.
Figure 18:
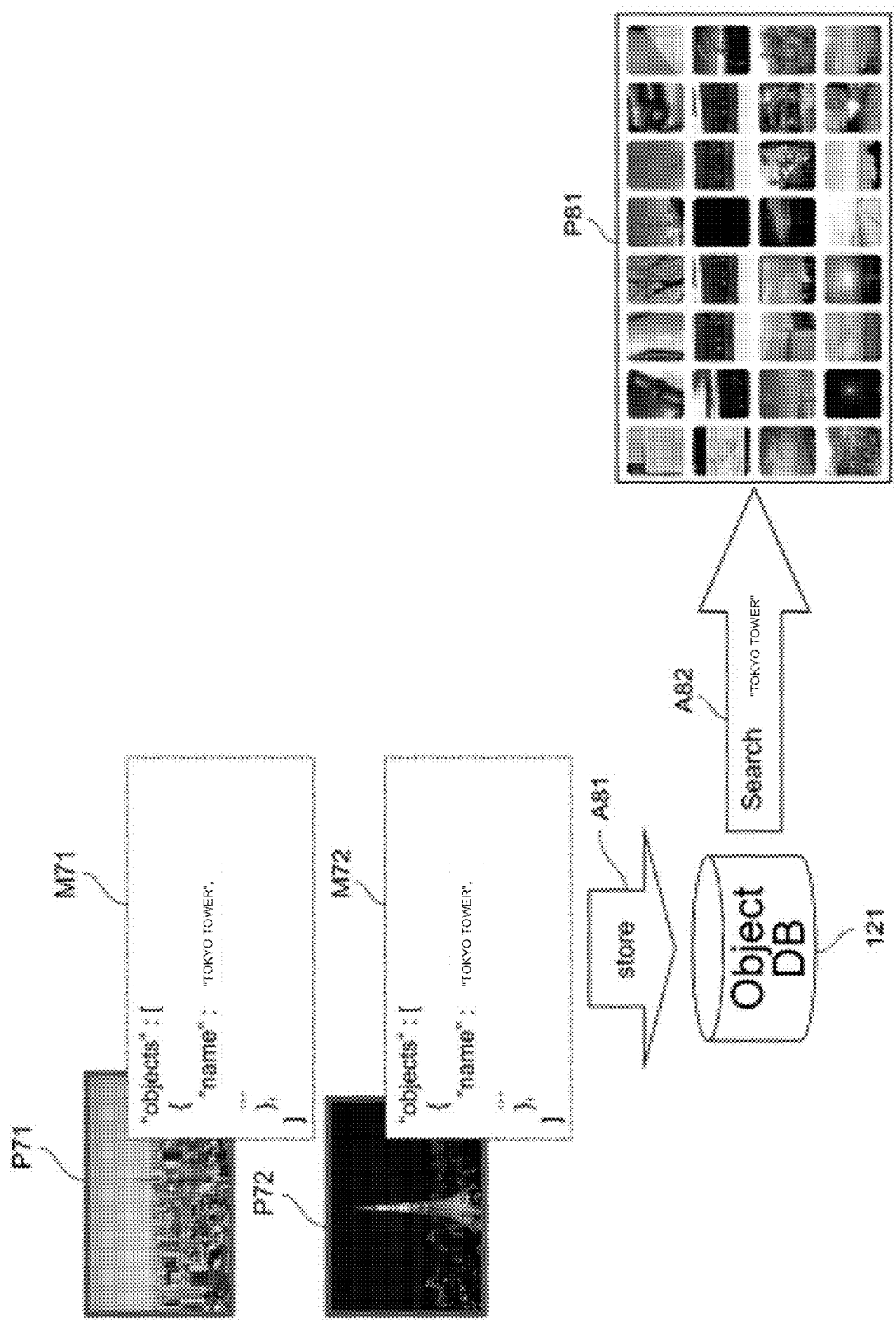
FIG. 18 is a diagram illustrating a processing example, when the original image is a landscape photograph, and when metadata includes object information such as positional information of a building and the like in the photograph.

FIG. 17 and FIG. 18 are diagrams each illustrating a usage example of image data including image encoded data and metadata having object information identified on the basis of the photographing position of the original image, direction, angle of view, and map information.

As illustrated in FIG. 17, a photographed image of Tokyo tower at latitude 35.65851 and longitude 139.745433 is encoded and stored in each of the original image data of image data P71 and image data P72 as image encoded data. Exif information of latitude 35.6591, longitude 139.741969, and azimuth N90° is stored in an area of APP1 (Exif) of the image data P71. Exif information of latitude 35.65851, longitude 139.745433, and azimuth N315° is stored in an area of APP1 (Exif) of the image data P72.

An operation unit 112 of the information processing devices 1A, 1B, and 1C inputs the image data P71, refers to Map database 111 connected via a network, which is not illustrated, and acquires object information relating to the Exif information stored in the image data P71. On the basis of the object information acquired from the Map database 111, as indicated by an arrow A71, the operation unit 112 generates metadata M71 described using JSON.

An operation unit 113 of the information processing devices 1A, 1B, and 1C inputs the image data P72, refers to the Map database 111 connected via a network, which is not illustrated, and acquires object information relating to the Exif information stored in the image data P72. On the basis of the object information acquired from the Map database 111, as indicated by an arrow A72, the operation unit 113 generates metadata M72 described using JSON.

In metadata M71 and M72, the first row contains "'objects': [", the second row contains "{", the third row contains "'name': 'Tokyo tower',", the n-1st row contains "}", and the n-th row contains "]". Information described after "'objects'" indicates the object information. In other words, the metadata M71 and M72 include the object information relating to the photographing position.

The information processing devices 1A, 1B, and 1C store the generated metadata M71 in an area of APP11 of the image data P71, and store the generated metadata M72 in an area of APP11 of the image data P72.

As indicated by an arrow A81 in FIG. 18, the information processing devices 1A, 1B, and 1C can supply the image data P71 in which the metadata M71 is stored and the image data P72 in which the M72 is stored, to object database 121 connected via a network, which is not illustrated, and control the image data P71 and the image data P72 therein. Consequently, when an image is searched using "Tokyo tower" as a search key, the information processing devices 1A, 1B, and 1C can search the image data P71 and P72 in which the metadata M71 and M72 include "Tokyo tower", from a plurality of pieces of image data controlled by the database 121. Then, as indicated by an arrow A82, the information processing devices 1A, 1B, and 1C can display an image list P81 including a plurality of thumbnail images of the searched image data.

In this manner, with the fifth modification, by generating the image data including the encoded data and the metadata having the object information identified on the basis of the photographing position of the image data, direction, angle of view, and map information, and controlling the generated image data by the database, it is possible to easily search the image data in which the metadata including a search key is stored, by specifying the search key.

The embodiment of the present disclosure has been described. However, the present disclosure is not limited to the embodiment described above, and various modifications may be made without departing from the spirit and scope of the present disclosure. For example, time information and area information are described in the metadata explained in the example of the image reproduction process for trimming an image, time information and text data are described in the metadata explained in the example of the audio image reproduction process, and alteration detection data is described in the metadata explained in the example of the image reproduction process accompanied by detection of alteration. However, it is also possible to generate metadata in which time information, area information, and text information are described. With such a configuration, at the display timing that matches with the time information described in the metadata, it is possible to display only a predetermined area of image data in a trimmed manner, on the basis of the area information associated with the time information. Moreover, it is possible to turn the text data associated with the time information into an image, and display subtitles by superposing the text image turned into an image on the image data.

Moreover, it is possible to generate metadata in which time information, area information, and alteration detection data are described, metadata in which time information, text data, and alteration detection data are described, and metadata in which time information, area information, text information, and alteration detection data are described. With such a configuration, only when it is detected that the image data is not altered, according to the alteration detection data described in the metadata, it is possible to display only a predetermined area of the image data in a trimmed manner at a prescribed display timing, display subtitles on the image data at a prescribed timing, or display only a predetermined area of the image data in a trimmed manner and display subtitles on the image data at a prescribed timing.

In the modifications, the object information, the photographing position information, and the like are described in the metadata. However, it is not limited thereto, and the image data may contain information such as the face of Mr. Yamada is at an x coordinate of 300 and y coordinate of 200, and the face of Mr. Suzuki is at an x coordinate of 500 and y coordinate of 300. With such a configuration, it is possible to extract an image of Mr. Yamada from a plurality of pieces of image data, and search the face (position) of Mr. Yamada in the extracted image.

Moreover, data such as image information, date and time, place, status, and the like detected by performing a predetermined image recognition process on the image data captured by a drive recorder, a security camera, and the like may be described in metadata. With such a configuration, it is possible to extract an image in a dangerous situation from a plurality of pieces of image data, by image analysis.

In the above, the image data generation device 30, the image reproduction device 40, the audio image data generation device 50, the audiovisual player 60, and the image data alteration detection device 70 are provided in the same information processing devices 1A, 1B, and 1C. However, each of the functions may be provided as a separate device.

Moreover, the series of processes described above may be executed by hardware or may be executed by software. When the series of processes is to be executed by software, a computer program that configures the software is installed into a computer embedded in dedicated hardware, or into a general personal computer, for example, capable of executing various functions by installing various computer programs, from a computer program recording medium.

The computer program executed by the computer may be a computer program that performs processing in time series according to the order described in the present specification, or may be a computer program that performs processing in parallel or at a required timing such as when a call is made.

According to the present disclosure, it is possible to provide the image data alteration detection device, the image data alteration detection method, and the data structure of image data that can easily detect an alteration in image data.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data alteration detection device, comprising:
an alteration detector that detects an alteration in image data including data obtained by encoding an image and metadata that is data relating to the image data, wherein
the metadata at least includes a first hash value calculated based on a parameter embedded in a predetermined area of the image data in advance, and a second hash value calculated based on a character string of a script, and
the alteration detector calculates a third hash value based on the parameter and the script included in the metadata, calculates a fourth hash value based on the character string of the script included in the metadata, compares the first hash value included in the metadata with the third hash value being calculated and the second hash value included in the metadata with the fourth hash value being calculated, and detects that the image data is altered when one of the values is not equal.

2. The data alteration detection device according to claim 1, further comprising an image data reproducer that reproduces an image based on the image data, when an alteration in the image data is not detected by the alteration detector.

3. A data alteration detection method comprising:
detecting an alteration in image data including data obtained by encoding an image and metadata that is data relating to the image data, wherein
the metadata at least includes a first hash value calculated based on a parameter embedded in a predetermined area of the image data in advance, and a second hash value calculated based on a character string of a script, the detecting an alteration further comprising:
calculating a third hash value based on the parameter and the script included in the metadata;
calculating a fourth hash value based on a character string of the script included in the metadata; and
comparing the first hash value included in the metadata with the third hash value being calculated, and the second hash value included in the metadata with the fourth hash value being calculated, wherein
the comparing detects that the image data is altered when one of the values is not equal.

* * * * *